(12) United States Patent
Ammendolia

(10) Patent No.: US 11,989,985 B2
(45) Date of Patent: May 21, 2024

(54) ELECTRONIC TROLLEY LOCK SYSTEM

(71) Applicant: Domenic Ammendolia, Abbotsford (AU)

(72) Inventor: Domenic Ammendolia, Abbotsford (AU)

( * ) Notice: Subject to any disclaimer, the term of this patent is extended or adjusted under 35 U.S.C. 154(b) by 267 days.

(21) Appl. No.: 17/282,363

(22) PCT Filed: Oct. 7, 2019

(86) PCT No.: PCT/AU2019/051082
§ 371 (c)(1),
(2) Date: Apr. 1, 2021

(87) PCT Pub. No.: WO2020/069581
PCT Pub. Date: Apr. 9, 2020

(65) Prior Publication Data
US 2021/0343093 A1  Nov. 4, 2021

(30) Foreign Application Priority Data
Oct. 5, 2018 (AU) .............................. 2018101489

(51) Int. Cl.
*G07C 9/00* (2020.01)
*G07C 9/25* (2020.01)
*H04W 4/029* (2018.01)

(52) U.S. Cl.
CPC ........... *G07C 9/00309* (2013.01); *G07C 9/25* (2020.01); *H04W 4/029* (2018.02); *G07C 2009/00642* (2013.01)

(58) Field of Classification Search
None
See application file for complete search history.

(56) References Cited

U.S. PATENT DOCUMENTS

| 7,063,022 B1 * | 6/2006 | Marchiori | B61D 7/30 105/241.2 |
| 2011/0307394 A1 * | 12/2011 | Rzepecki | G06Q 30/0645 705/13 |
| 2012/0035823 A1 * | 2/2012 | Carter | A47F 10/04 701/1 |

(Continued)

FOREIGN PATENT DOCUMENTS

| CN | 103971435 A | 8/2014 |
| CN | 107181742 A | 9/2017 |

(Continued)

OTHER PUBLICATIONS

Kuroda, Bicycle Serving as Cart, Nov. 29, 1994, Machine Translation (Year: 1994).*

(Continued)

*Primary Examiner* — Carlos Garcia
(74) *Attorney, Agent, or Firm* — McCarter & English, LLP

(57) ABSTRACT

An electronic trolley lock system and a method for providing trolley service based on a request of a registered user intending to use a trolley enabled with an electronic trolley lock device. The method and system can enable tracking of trolley use and locating abandoned trolleys. The system can also enable performing a transaction when a trolley is unlocked and performing a reverse transaction on return of the trolley by a registered user.

19 Claims, 20 Drawing Sheets

(56) References Cited

U.S. PATENT DOCUMENTS

| | | | | |
|---|---|---|---|---|
| 2012/0056399 A1* | 3/2012 | Hon | ............... | B62K 15/008 |
| | | | | 280/278 |
| 2013/0317693 A1* | 11/2013 | Jefferies | ............ | B60R 25/24 |
| | | | | 701/31.5 |
| 2016/0189311 A1* | 6/2016 | Erickson | .......... | B60K 35/00 |
| | | | | 705/4 |
| 2020/0234526 A1* | 7/2020 | Ruggiero | .......... | G06Q 20/18 |
| 2021/0179159 A1* | 6/2021 | Bhatia | ............ | G07F 17/0057 |
| 2021/0343093 A1* | 11/2021 | Ammendolia | ..... | G07C 9/00309 |

FOREIGN PATENT DOCUMENTS

| | | |
|---|---|---|
| CN | 107481364 A | 12/2017 |
| CN | 107527446 A | 12/2017 |
| CN | 107818613 A | 3/2018 |
| WO | WO 2012/151290 A1 | 11/2012 |
| WO | WO 2013/142896 A1 | 10/2013 |

OTHER PUBLICATIONS

International Search Report and Written Opinion prepared for International Application PCT/AU2019/051082 by the Australian Patent Office, acting as the International Searching Authority, dated Nov. 28, 2019.

\* cited by examiner

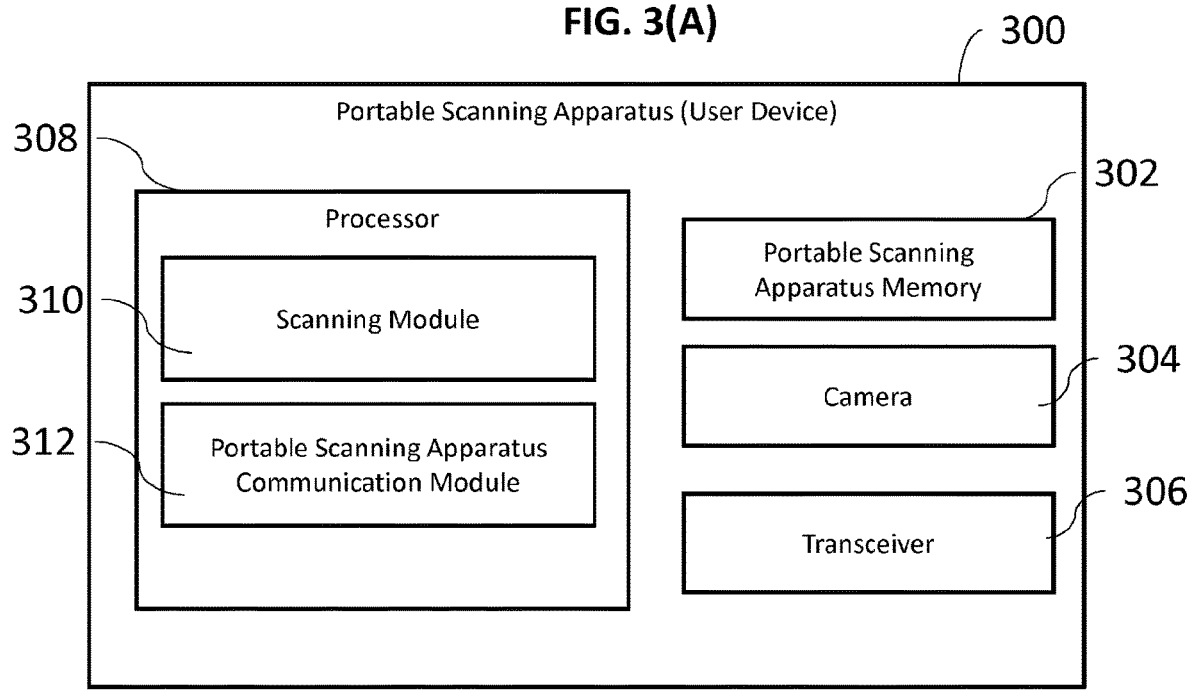
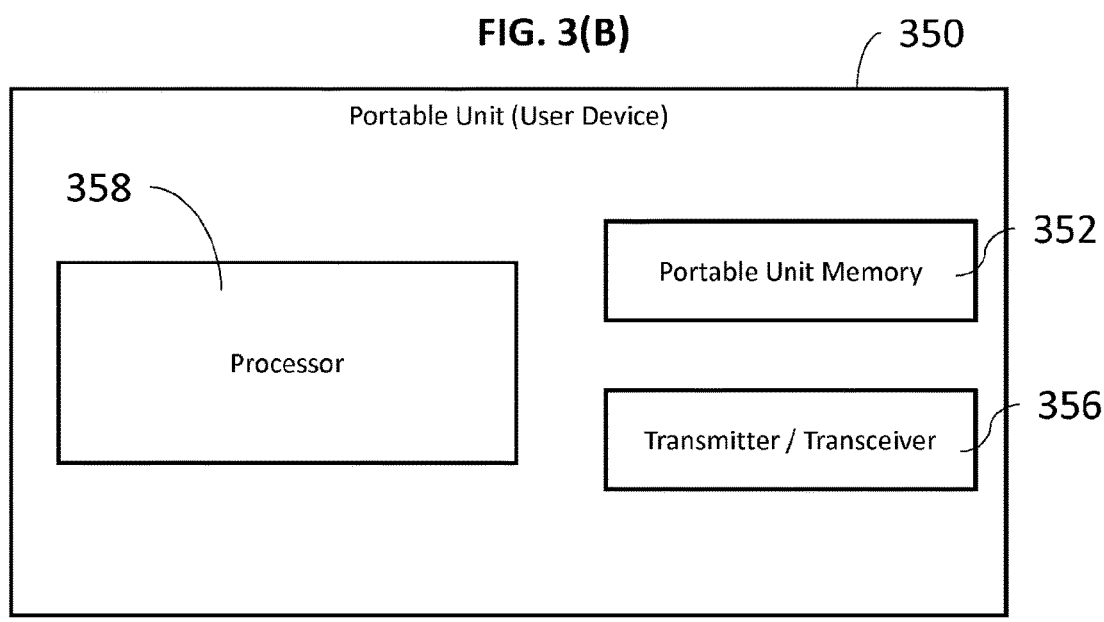

ELECTRONIC TROLLEY LOCK SYSTEM

CROSS-REFERENCE TO RELATED APPLICATIONS

This application is the National Stage entry under 35 U.S.C. § 371 of International Application Number PCT/AU2019/051082 filed on Oct. 7, 2019, published on Apr. 9, 2020 under publication number WO 2020/069581 A1, which claims the benefit of priority under 35 U.S.C. § 119 of Australian patent application number 2018101489 filed Oct. 5, 2018.

TECHNICAL FIELD

The present disclosure related to electronic methods and systems for securing and tracking trolleys. Applications of embodiments of the system include tracking usage of shopping trolleys and determining when trolleys have been removed from an authorised area or abandoned.

BACKGROUND ART

The trolleys are used for variety of purposes. Trolleys are generally used for transferring goods from one place to another. There are various types of trolleys that are used for various purposes. One of the well-known type of the trolley is a shopping trolleys which is used by various users during shopping in a store. Trolleys are typically provided for use by shoppers at shopping complexes or at particular stores for use while shopping with the expectation that the trolleys will be returned to holding areas, rather than being left scattered through a car park or removed from the store or shopping complex vicinity. For example, trolley holding areas can be located at the store or in the shopping complex, also return bays may be provided in or near car parks or near exits from the shopping area, for example near public transport service access.

Users returning trolleys to such holding areas can significantly reduce the labour required on behalf of the shop or shopping complex management to return trolleys to the initial holding area for use again by other shoppers. Further, sometimes users remove trolleys from the shop or shopping centre vicinity and abandoning these some distance away, is also costly. For example, costs are incurred to find trolleys abandoned, say in suburban streets, and transport such abandoned trolleys back to the shopping complex holding areas. Costs are also incurred to replace trolleys that have been damaged or vandalised after removal from the shopping area.

Often shopping complexes are dependent on the goodwill of their patrons to return trolleys to designated return bays. Trolleys are typically designed to nest to reduce storage space. It is known to also provide mechanical locking devices which have a locking unit, mounted on the handlebar of the trolley, the locking unit having a removable locking member (referred to a key, pin or toggle) attached to a short chain which fits into the locking unit of an adjacent nested trolley to lock the two together, multiple trolleys can be serially (daisy-chain) locked together. A coin is required to be inserted into a slot in the locking unit to unlock the trolley, and when the trolley is returned and again locked to an adjacent trolley the coin will be returned. The coin denomination (therefore cost if the trolley is not returned) is fixed. This required a user to have the correct coin to use the trolley. In a similar system a user can buy a "trolley token" which is a mechanical imitation of a coin. The cost of the token may be different from the coin denomination that the coin slot was designed to take (and the token emulates) but this system depends on the user either having the appropriate token.

Currently, the users do not have any reward or incentive to place the trolley at an authorised trolley holding area other than return of their coin or token. Further there is no disincentive or penalty, beyond loss of the coin or token, discarding and abandoning of shopping carts or trolleys within the community. Further coin or token based trolley locking systems do not enable identification of users who abandon trolleys, either inside or outside the area where they are available for use.

There are known wheel locking system, a wheel lock is installed on each trolley, and barriers under the floor of all entries and exits. When the trolley passes over this barrier, the wheel locks, and the customer is unable to take the trolley any further. This prevents trolleys from leaving the shopping complex. This is effective at reducing the removal of trolleys from the shopping area, but does have some problems. Installing barriers at every exit requires major construction work and is expensive. The system can also be to easily avoided, for example, customers may simply lift the trolley wheel as they pass over the barricade to avoid locking the wheel. Further this system poses a safety hazard. When the lock crosses the barrier, it locks immediately. This causes the trolley to come to a sudden stop in the exit. Aside from seriously disrupting pedestrian traffic, this can injure the person pushing the trolley, any children in the trolley, and/or anyone walking behind the trolley. This system also requires staff to manually unlock the locked trolley wheels, and the trolley is not usable while the wheel is locked. There is also no functionality for tracking of any trolleys removed from the shopping area.

Further, coins-based or token-based trolleys may not provide a desired experience to users. For example, a study conducted by RBA shows a decline in cash consumer payment methods since 2007. In 2007 69% of consumers paid with cash, in 2016 that number was reduced to just 37%, while 26% of consumers used contactless payment in 2007, that number doubled to 52% in 2016. (information form rba.gov.au "How Australians Pay: New Evidence Survey.")

In a similar survey conducted in the USA showed that 40% of people preferred credit cards, 35% preferred debit cards, 11% prefer cash. (Information from TSYS 2016 US consumer payment study).

Based on above facts, many consumers may enter a store without cash, coins or tokens, intending to use a trolley but have no way of unlocking the trolley and therefore are either forced to use an alternative such as a basket or not complete a full shop, reducing the amount they were originally going to buy or spend or wait in line at a counter to try to obtain coins or tokens, or worse leave the business frustrated that they were unable to unlock a cart or trolley. Therefore, a coin-less or token less trolley or a system to convert a conventional trolley to coin-less or token-less trolley is needed, to provide enhanced trolley usage experience to the users.

If a large number of trolley are abandoned outside the area it becomes a tedious task for the trolley managers to find the trolleys and meet new users' trolley demand, as sometime unavailability of the trolleys for the users at an authorised area are common. To avoid such situations, continuous manual tracking is required of the trolleys. The manual tracking of the trolleys involves human interventions/manpower and may lead to additional cost of operation for the business owners.

It is to be understood that, if any prior art is referred to herein, such reference does not constitute an admission that the prior art forms a part of the common general knowledge in the art, in Australia or any other country.

SUMMARY

In accordance with a first aspect of the invention, there is provided a communication network connected system controller, and a plurality of electronic trolley lock devices, each one of the plurality of electronic trolley lock devices configured for installation on a trolley, each electronic trolley lock device comprising: an electronically activated lock associated with the trolley, to when locked inhibit use of the trolley and when unlocked allow use of the trolley, a wireless communication module, and a device controller, comprising a processor and memory, the device controller being configured to: transmit trolley data to the system controller via the communication module, and in response to receiving an unlock request via the wireless communication module, unlock the electronically activated lock, and the system controller comprising: memory storing: for each of the plurality of electronic trolley lock devices associated with trolleys, one or more data elements, and registered user information, and processing resources programmed with instructions executable to implement a communication control module configured to control communication with at least one of: each of the electronic trolley lock devices via the communication network, and user devices associated with registered users via the communication network, and an authentication module configured to: associate a registered user with an electronic trolley lock device of a trolley currently in use by the registered user based on trolley data received via the communication module, and store the association in memory.

In accordance with a second aspect of the invention, there is provided a method for trolley service based on a request of a registered user intending to use a trolley enabled with an electronic trolley lock device, the method comprising: receiving by a system controller a trolley data signal including trolley data identifying the trolley and the registered user, derived from one or more actions performed by the registered user indicating a request to use the trolley, processing by the system controller, an authentication of the trolley data, if authorized, sending, by the system controller, unlocking request instructions to an electronic trolley lock device associated with the trolley, in response to the unlock instruction, unlocking by the electronic trolley lock device, an electronically activated lock associated with the trolley to provide an unlocking functionality by unfixing the trolley from a trolley holding area, and transmitting unlock confirmation to the system controller.

In accordance with a third aspect of the invention, there is provided a method for trolley service based on a request of a registered user intending to use a trolley enabled with an electronic trolley lock device, the method comprising: receiving by the electronic trolley lock device user information, derived from one or more actions performed by the registered user indicating a request to use the trolley, processing by the electronic trolley lock device, an authentication of the user information, if authorized, unlocking by the electronic trolley lock device, an electronically activated lock associated with the trolley to provide an unlocking functionality by unfixing the trolley from a trolley holding area, and transmitting unlock confirmation to a system controller.

In accordance with a further aspect, there is disclosed a machine executable code for implementing the system disclosed in any form above.

BRIEF DESCRIPTION OF THE DRAWINGS

Embodiments will now be described by way of example only, with reference to the accompanying drawings in which:

FIG. 3 (A) is a schematic representation of a user device according to an embodiment;

FIG. 3 (B) is a schematic representation of a user device for use with an embodiment of an electronic trolley lock system;

DETAILED DESCRIPTION

Figure 1:
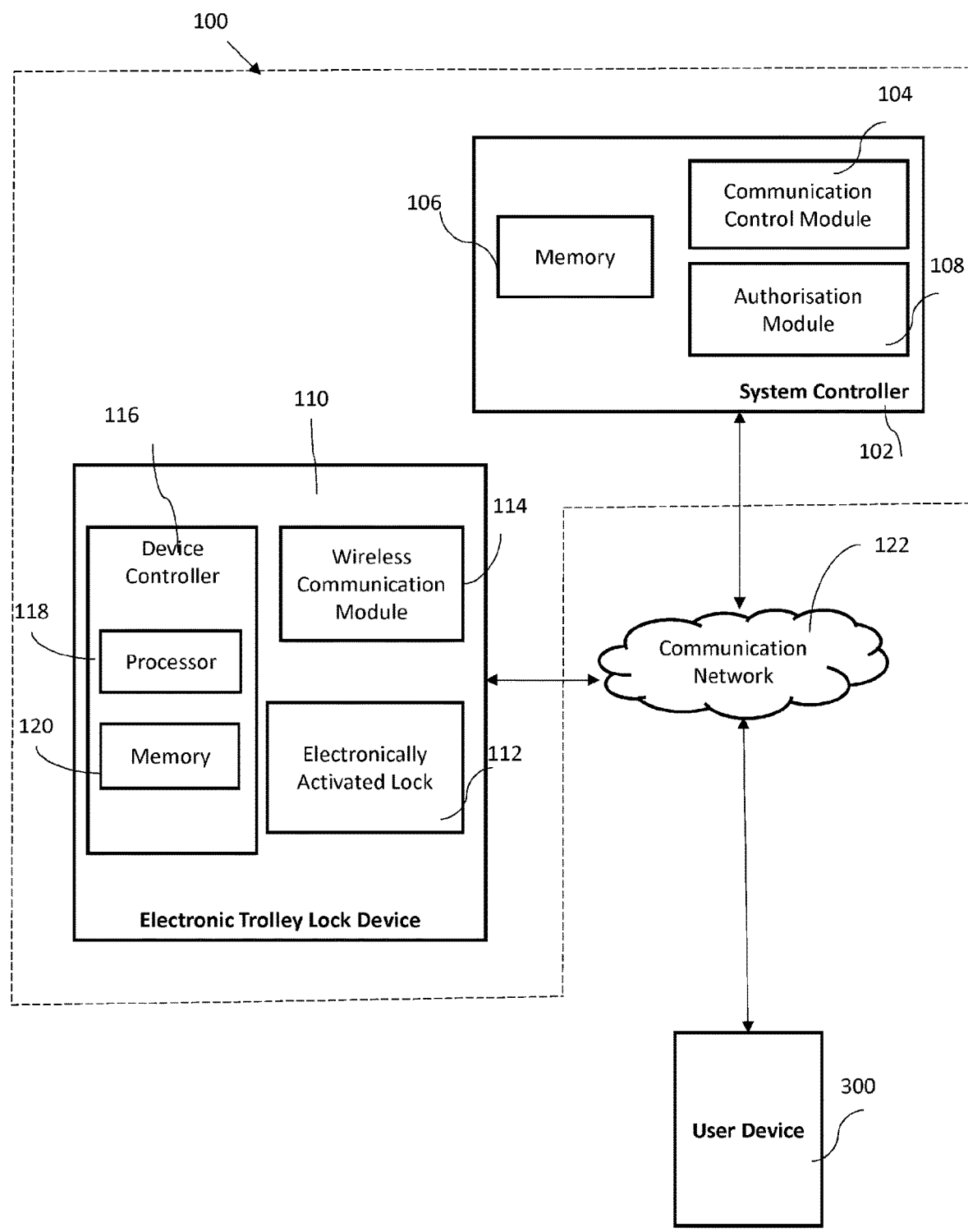
FIG. 1 is a block diagram of an electronic trolley lock system according to an embodiment.

This disclosure relates generally to an electronic trolley lock system and more specifically to systems, methods and machine executable code for providing trolley service to a registered user. The disclosure also relates to unlocking a trolley using an electronic trolley lock device attached to the trolley and associating a registered user with the trolley, while using the trolley. The disclosure has an application of providing paid services of trolleys to plurality of users and management of the trolleys by monitoring the trolleys location, movement and state. The disclosure also has one particular application to encourage users to place trolleys in a trolley holding area when they have finished using the trolley.

In the following detailed description, reference is made to accompanying drawings which form a part of the detailed description. The illustrative embodiments described in the detailed description, depicted in the drawings and defined in the claims, are not intended to be limiting. Other embodiments may be utilised, and other changes may be made without departing from the spirit or scope of the subject matter presented. It will be readily understood that the aspects of the present disclosure, as generally described herein and illustrated in the drawings can be arranged, substituted, combined, separated and designed in a wide variety of different configurations, all of which are contemplated in this disclosure.

In the following description and claims "trolley" is used to refer to a (typically wheeled) device with a basket or tray used for the conveyance multiple or large items, for example goods or luggage, typically borrowed and used temporarily within an area such as a store or other facility (for example, shopping centre, airport or train station), such conveyance devices may also be referred to as a "cart" or possibly "buggy" and all such equivalents are contemplated within the context of the present description.

FIG. 1 is a block diagram of an electronic trolley lock system according to an exemplary embodiment of the present invention. As depicted in the FIG. 1, the system comprises an electronic trolley lock device 110, and a system controller 102 which can communicate via a communication network 122. The electronic trolley lock device 110 comprises a device controller 116, a wireless communication module 114 and an electronically activated lock 112. The device controller 116 is implemented using one or more processors 118 and memory 120 to store information. The system controller 102 comprises communication control module 104, an authorisation module 108, and memory 106 to store information. The system controller 102 and the electronic trolley lock device 110 communicate with each other via the communication network 122. The system is based on various hardware components and software modules. Each software module is software that utilises hardware or combination of hardware to implement one or more functionality disclosed in the present invention.

The communication control module 104 provides bidirectional communication between the system controller and user devices via a communication network 122. The communication control module is also configured to communicate with a plurality of electronic trolley lock devices via the communication network 122. In some embodiments wireless gateways (not shown) may be used to provide the communication network access for the electronic trolley lock devices.

The authentication module 108 is configured to associate a registered user of the system with an electronic trolley lock device of a trolley currently in use by the registered user. This association is stored in memory, to track which trolley is in use by which user.

The information identifying the electronic trolley lock device and user is obtained during an unlock process (described in more detail below). The system can also store information regarding end of use of the trolley by the user, to identify whether the trolley has been returned to a holding area or abandoned. This association can be utilized to implement regimes for payments or incentives for utilizing trolleys in an appropriate way (i.e. returning to trolley bays) and enabling imposing penalties or sanctions against users who have inappropriately used trolleys.

The association of user and trolley can be based on trolley data received from the electronic trolley lock device 110 via the communication module 104. This data may be transmitted by the electronic trolley lock device 110 and may also be transmitted from a user device, such as a mobile phone 300 executing software to facilitate interaction between the user, user device and trolley lock system 100.

Each one of the plurality of electronic trolley lock devices 110 is configured for installation on a trolley. Each electronic trolley lock device comprises, a device controller 116, a wireless communication module and an electronically activated lock 112. The electronically activated lock is configured to inhibit use of the trolley when locked and allow use of the trolley when unlocked. The electronic trolley lock device 110 may enable converting a conventional trolley to a smart trolley. The locking mechanism may be similar to that already known from the prior art, such as a wheel lock or a toggle and chain/cable type lock, or any other suitable locking mechanism, which can be activated to unlock by an electrical signal. In some embodiments relocking may also be triggered electronically, however relocking may also be triggered in manners other than using an electrical signal, for example mechanically, (for example, re-inserting a locking toggle into the lock, or replacing a trolley wheel in a locking rail) or magnetically (for example, passing over or near a localised magnetic field).

The device controller 116 is configured to control and monitor the status of the lock and trolley. The device controller is implemented using at least one processor 118 and memory 120. The device controller 116 is configured to control unlocking of the trolley lock. For example, in response to receiving an unlock request via the wireless communication module 114, the controller activates unlock of the electronically activated lock. Relocking the lock may also be triggered electronically, but other actions may also cause relocking—for example reinserting a lock key or toggle. The controller 116 can also be configured to monitor operation of the device and control transmission of trolley data to the system controller. The trolley data may comprise one or more data elements. Data elements can include trolley information and user information.

The wireless communication module 114 is configured to facilitate communication to a from the system controller 102 and user devices 300. The communication module 114 of the electronic trolley lock device 110 can be configured to operate with any one or more of the following technologies: NFC, RF ID, Bluetooth, WIFI, GPS, GPRS, GALILEO, QZSS, GLONASS, IRNSS, BEIDOU NAVIGATION SATELLITE SYSTEM, LoRaWAN (Long Range Wide Area Network) or other wireless technology, other contactless communication technology, or Sim card, thus enabling the system controller to send and receive information.

The device controller 116 is configured to also transmit trolley data to the system controller 102 via the communication module 114 and communication network 122. Trolley data can be any trolley information required from the trolley by the system controller. For example, trolley information can include any one or more of trolley identifier, lock status, use status, battery status, operating mode, location data etc. Trolley data may also include user information, for example a user ID for the user of the trolley, or an ID for a user device used to unlock the trolley which can be associated with a user's account or service provider (for example for a trolley attendant unlock device or administrator key).

The system controller 102 of electronic trolley lock system 100 comprises: memory 106, storing: for each of the plurality of electronic trolley lock devices associated with trolleys, one or more data elements; and registered user information; and processing resources programmed with instructions executable to implement a communication control module 104 configured to control communication with at least one of: each of one or more of the electronic trolley lock devices via the communication network and user devices associated with registered users via the communication network.

The communication network 122 may be a group of networks and may utilise one or more of various state of art networking techniques for connecting any the system controller with the plurality of electronic trolley lock devices.

In accordance with an embodiment a plurality of electronic trolley lock devices are provided, each one of the plurality of electronic trolley lock devices configured for installation on a trolley. The system controller 102 may communicate with the plurality of electronic trolley lock devices.

The system can be utilised to implement a coinless or physical token free trolley borrowing service. The idea underlying the system described herein is for a shopping cart or trolley of the conventional design to have a coin-less or tokenless battery operated electronically activated lock device mounted on the handle bar. Trolleys can be unlocked for users, in response to a user action such as by scanning a QR or bar code on the lock device, scanning a sensor with other contactless communication technology, waving or tapping the NFC tap screen with a smart device, be it a smart phone, tablet, smart watch, wearable device or the like. Users have a registered account with the trolley system, so that the user can be associated with a trolley being used and any relevant transaction for use of the trolley (such as taking a deposit, virtual token, or nominal payment) executed. When the trolley is returned this is registered by the system and the user account updated. Embodiments also identify when trolleys have been abandoned, and due to association of the trolley with the user, can identify the user who abandoned the trolley.

In an embodiment a CPU inside the trolley lock device receives a signal (for example, via either NFC, RF ID, Bluetooth®, WIFI, GPS, GPRS, LoRaWAN™ or 3 g, 4 g, 5 g or other wireless signal or contactless communication technology) indicating a user desires use of the trolley, and request unlock of the trolley. Where using a device such as a mobile phone, smartwatch or tablet, a software application for the system can be enabled on the user device.

Figure 4:
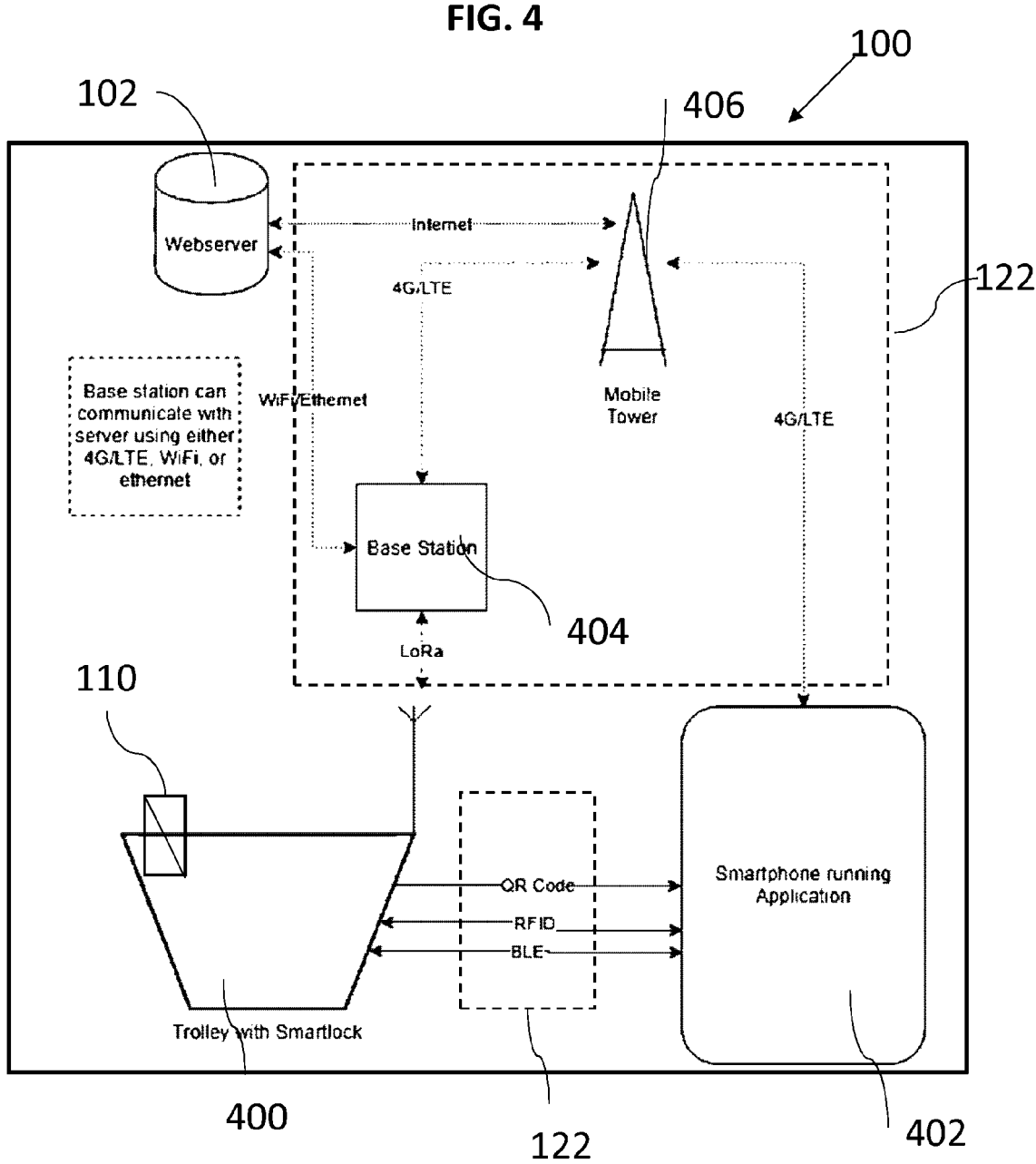
FIG. 4 schematically illustrates interaction amongst various modules and components of the electronic trolley lock system using one or more networks in accordance with an embodiment.
Figure 10:
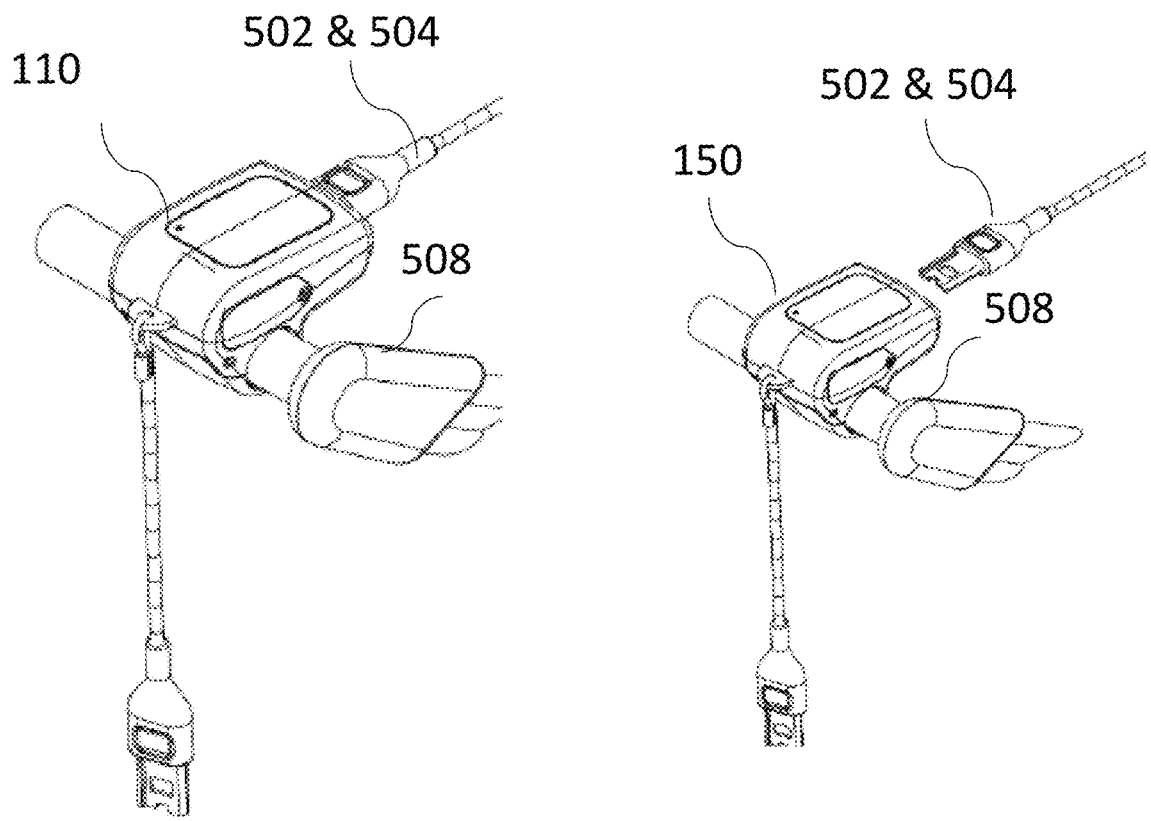
FIG. 10 illustrates an electronic trolley lock device fitted on a trolley handle and providing a locking and unlocking functionality according to an exemplary embodiment.

FIG. 4 schematically illustrates an example of interaction amongst various modules and components of the electronic trolley lock system using one or more networks. As depicted in FIG. 4, an electronic trolley lock device 110 is fitted on a trolley 400. FIG. 10 illustrates an example of an electronic trolley lock device fitted on a trolley handle and providing a locking and unlocking functionality according to an exemplary embodiment. As depicted in left side of the figure, locking functionality is provided when the electronic lock device is fitted on a handle of the trolley and locking cable 152 is used to fix the trolley at a trolley holding area, the device is in locked state. As depicted in right side of the figure, unlocking functionality is provided when the locking cable 152 is unfixed from the device, allowing the trolley to move to other areas.

Figure 5:
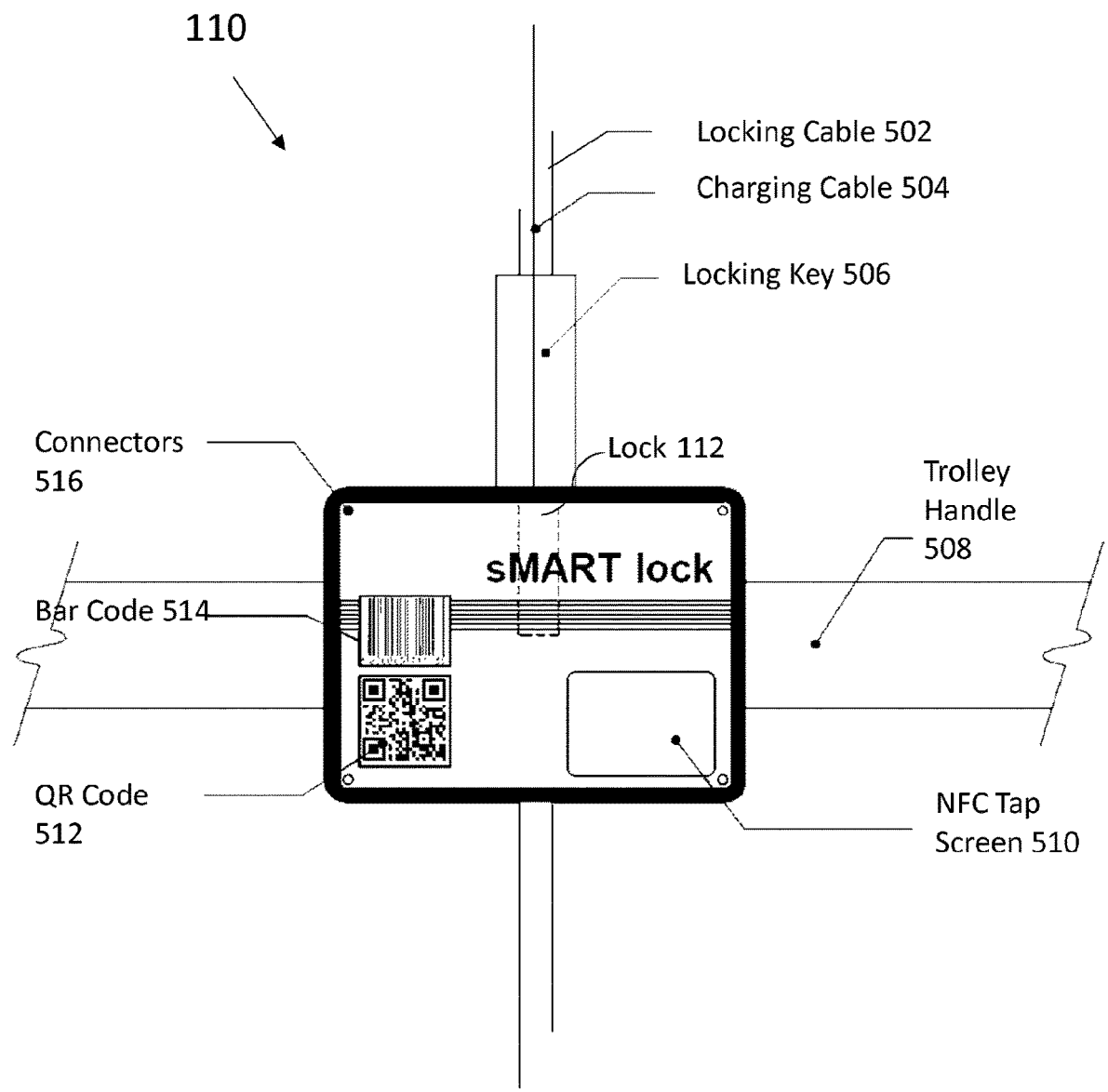
FIG. 5 illustrates an exterior view of an embodiment of an electronic trolley lock device.
Figure 11:
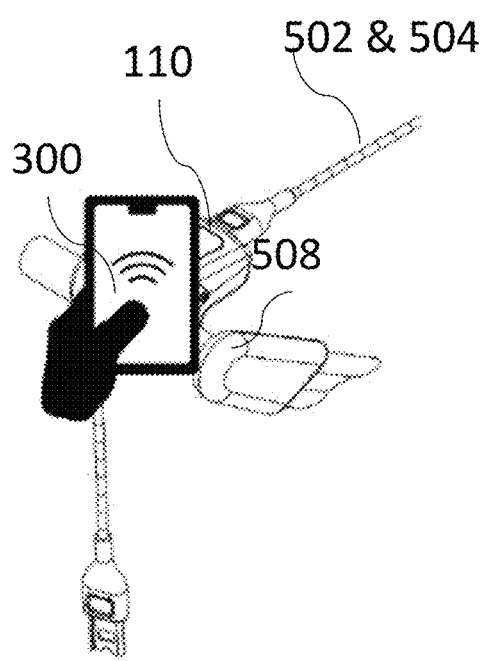
FIGS. 11 A & B illustrate an electronic trolley lock device fitted on a trolley handle and how a user device (A: mobile device or B: NFC card) can be used to unlock the electronic trolley lock device according to an exemplary embodiment.
Figure 11:
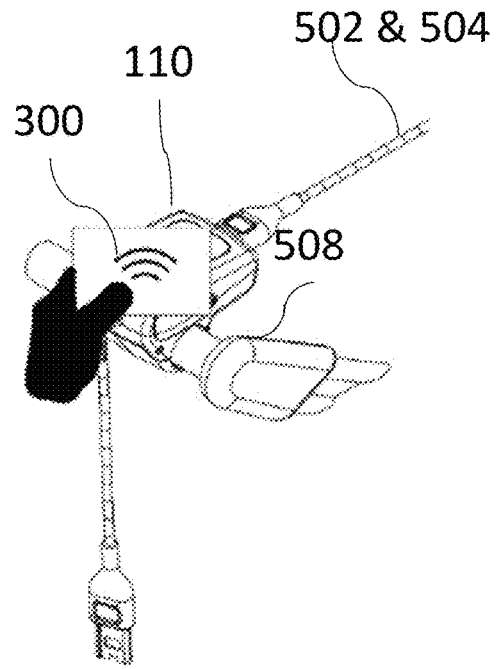

A user device (smart phone) 400 may be used to scan a QR code associated with the electronic trolley lock device or a trolley 400, for example using the phone camera, as illustrated in FIG. 11(A). An example of a bar code and QR code are shown in FIG. 5. The QR code information (trolley information) is retrieved by scanning the QR code. The trolley information encrypted in the QR code includes a trolley identifier and may also include other information such as an identifier for the trolley service provider, or centre code. The QR code may be decrypted by an application running on the user device in some embodiments, alternatively the QR code may be transmitted as trolley data to the System controller for decryption.

The application running on the smartphone 402 generates a trolley request signal including a trolley identifier (or the QR code) and user information (i.e. user identifier) retrieved from device memory. The trolley request signal is transmitted to the system controller 102 via the communication network. In this embodiment the webserver performs the functionality of the system controller. The webserver processes the QR code information (if required) and the user information and authenticates the request for the trolley. As depicted, the application running on the smart phone may communicate with the webserver using 4G/LTE cellular based communication technology. Authentication is based on the user's account status and usage rules. For example, if a user fails to return trolleys or had abandoned one or more trolleys, then the user's account may be suspended or blacklisted and the unlock request denied.

In response to successful authentication, the webserver 102 can send an unlock request to the electronic trolley lock device using any compatible connectivity mechanism such as Wi-Fi/Ethernet, 4G/LTE cellular based communication technique, LoRaWAN (Long Range Wide Area Network) or any IOT based connectivity technique. The webserver 102 may also send an unlock request to the trolley through a base station 404 using Wi-Fi/Ethernet or any mobile tower 406 using 4G/LTE cellular based communication technique. In response to receiving the unlock signal by the wireless communication module 114 the trolley device controller 116, actuates the electronically activated lock 112 to unlock the trolley. For example, releasing a locking mechanism retaining the locking key attaching the trolley to those it is nested with, release a wheel lock or release the trolley from a holding rail, to enable the user to take the trolley.

As depicted in the FIG. 4, a user device (smart phone) 400 may also communicate with the electronic trolley lock device using NFC/RFID or BLE/LoRa communication technique 122. A smart phone with RFID (or NFC) capability may be tapped on the electronic trolley lock device comprising an RFID (or NFC) active tap to transfer user information stored on the smart phone. In this case, the trolley lock device 110 may send a trolley unlock request comprising the trolley data to the webserver. The trolley data can include user identification based on the scanned RFID or NFC, and a trolley identifier for the trolley. The webserver authenticates the request based on processing of the trolley data. In response to successful authentication, the webserver may send an unlock request to the electronic trolley lock device using any of the communication technologies as disclosed in FIG. 4 to unlock the trolley as discussed above.

As depicted in the FIG. 4, a smart phone with BLE/LoRa capability can also be used to share information between the electronic trolley lock device and the smartphone 402. Thus enabling trolley data (comprising user information and trolley information) to be prepared using the processing resources of either of the electronic trolley lock device or the smart phone, and transmitted to the webserver for authentication using any of the communication techniques as depicted in the FIG. 4.

In response to authentication, an unlock request is sent to from the webserver to the electronic trolley lock device through communication technique as depicted in FIG. 4. In response to receiving the unlock signal from the system controller 102, the trolley lock device 110 will electronically release the locking mechanism or pin. This step may also trigger transmission of an unlock confirmation signal by the electronic trolley lock device. Optionally a pop up or banner style message can also be displayed on the user device, via the software application, the message confirming a successful unlock and that a deposit has been taken from the users account.

Upon returning and locking a shopping cart or trolley to a designated cart or trolley parking bay, the successful relocking is detected by the electronic trolley lock device, and a signal is transmitted back to the server 102 to confirm the returned status, and enable the system controller 102 to update the users account. The re-lock and returned status confirmation signal can be transmitted similarly to the unlock confirmation, using any of the techniques as discussed above. Relocking of the trolley may be detected on re-insertion of the locking key, a sensor detecting return of the trolley to a holding rail (such as commonly used in airports and train stations). In some embodiments, for example a wheel lock embodiment, relocking may be triggered electronically in response to detection of the trolley passing a barrier strip or proximate a base station indicating placement of the trolley into a holding area. In some embodiments, a user request for relocking on return may also be transmitted via the smartphone app or tapping a reader similarly to an unlock request. In this embodiment, as the unlock request may be able to be sent when the trolley is not in a designated holding area, the location of the trolley may be checked before relocking and any user account reconciliation action. The system controller, in response to appropriate trolley return can update and reconcile the user account, for example to return a virtual token or provide any reward. System controller may transmit a return confirmation to the user device for display via the application as a pop up or banner style message confirming a successful lock and deposit return.

In accordance with an embodiment, the system controller 102 may reside on one or more servers. When the system controller is distributed across a plurality of servers, the plurality of servers communicates between/amongst each other using a state of art communication, networking or cloud-based technology.

User devices 300 used with the system 100 may be or include any of a passive NFC (Near Field Communication) tag, a passive RFID (Radio Frequency Identification) tag, a device with NFC capability, a device with RFID capability, an imaging device, a device with Bluetooth Low Energy (BLE) capability; or a device with LoRaWAN (Long Range Wide Area Network) based capability. User device 300 may also be a consumer electronic device such as a mobile device, a wearable device, a tablet or any other similar handheld device. The user device is used to trigger unlock of the trolley and identify the user—to enable the system controller to associate the trolley with the user.

In some embodiments the trolley lock device can be configured to, in some circumstances, unlock the trolley before verification by the system controller. In other embodiments unlocking a trolley is performed only after receiving an unlock authorization signal from the system controller.

The electronically activated lock and the electronic trolley lock device of some embodiments is implemented to retrofit to existing trolleys, using standalone hardware and communicate with one or more communication technique available in state of art.

Embodiments of the system 100 may also comprise additional modules or components apart from ones depicted in FIG. 1, in particular embodiments of the system include trolley location tracking functionality.

Figure 2:
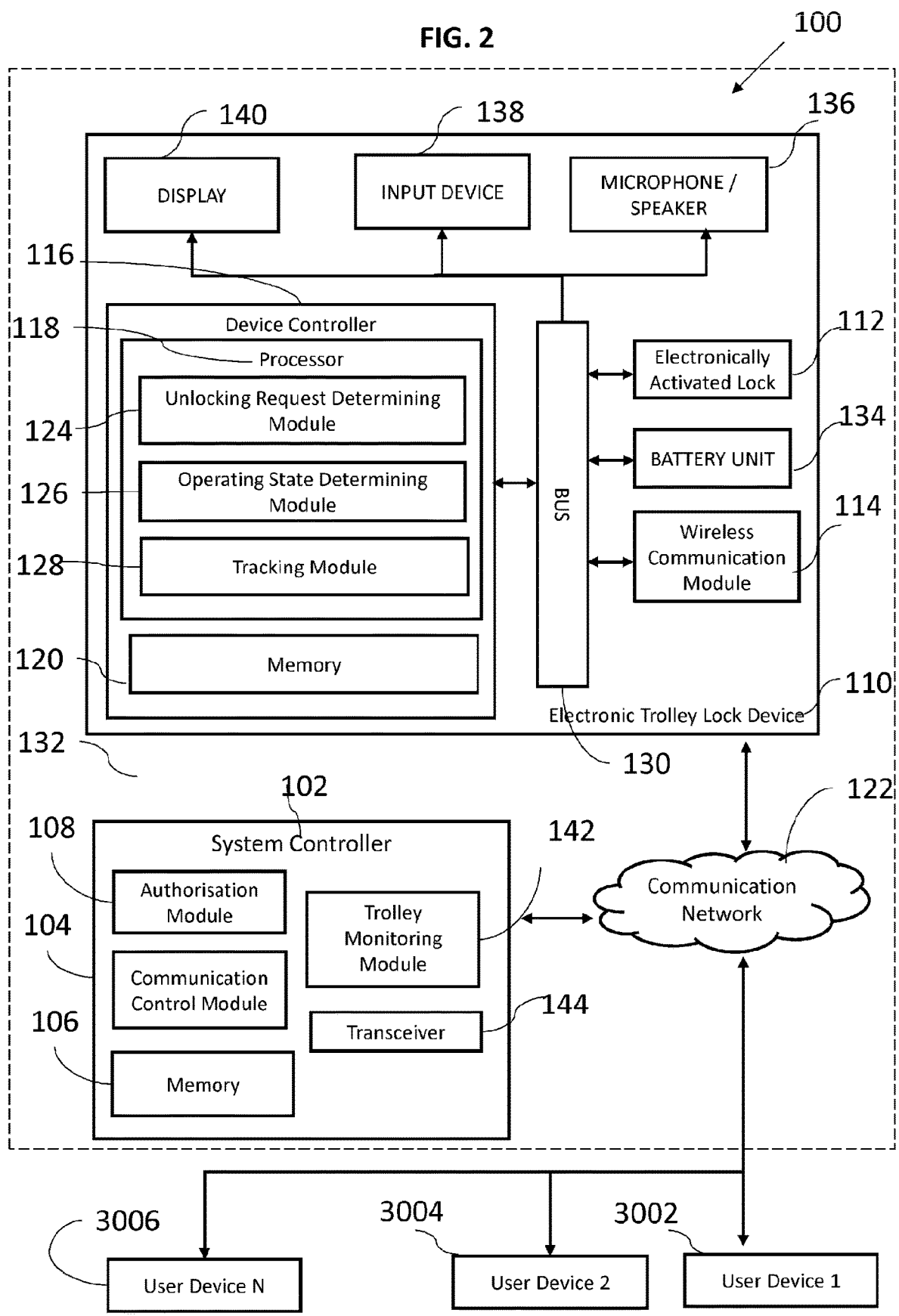
FIG. 2 is a detailed block diagram of an electronic trolley lock system according to another embodiment.

FIG. 2 is a detailed block diagram of an electronic trolley lock system according to an exemplary embodiment. The system comprises all module/components shown in the FIG. 1 and few additional modules or components not depicted in FIG. 1.

As depicted in FIG. 2, the electronic trolley lock device may further comprise a display 140, an input device 138, a microphone or a speaker 136 and a battery unit 134. The device controller 116 may further comprise unlocking request determining module 124, operating state determining module 126, and a tracking module 128. The device controller may comprise one or more processors 118 to run instructions stored in memory 120. The processor 118 is configured to execute one or module as part of the device controller 116. All components and modules part of the system as depicted in FIG. 2 may communicate amongst each other using bus 130.

To display information, the electronic trolley lock device may include a display 140, for example, a cathode ray tube (CRT), a light-emitting display (LED), or a liquid crystal display (LCD), connected to the bus 130.

The input device 138, may include alphabet keys, number keys, and other keys, may be connected to the bus 130 to transmit an input to the device controller 116. Another type of user input device may be the touch/gesture/voice controller 106 for swipe, pattern, voice recognition, or a cursor direction key for transmitting an input to the device controller 116 and controlling cursor movement on the display unit 140. Alternatively, the input device 138 may be included in the display unit 140, for example as a touch screen. The touch screen can be configured to receiver user information from a user.

The battery unit 134 is to power one or more components of the electronic trolley lock device. The battery unit 134 may have one or more batteries. The batteries may be replaceable, chargeable or non-chargeable type. When battery is chargeable it may be charged through a charging source. The battery unit may include a charging control circuit which enables, along with charging of the rechargeable battery, output of a portion of the input power to a connected electronic trolley lock for also charging the attached trolley. In some embodiments the electronic trolley lock device may comprise a self-charging module to charge one or more battery associated with the battery unit 134.

The electronic trolley lock device further comprises a tracking module 128. The tracking module is configured to determine the location of the trolley and transmit this as trolley data to the System controller 102. The tracking module may comprise a location tracking module, comprising at least one of: a global positioning system module, an indoor positioning system module; and a cellular network-based positioning module. The tracking module is configured to provide location data to the system controller to enable the system controller to monitor locations of trolleys. For example, while the trolley is in use, the communication module of the trolley lock device 110 may periodically transmit trolley data including the location information. The frequency of periodic transmission of location data may be increased during times of use. In another embodiment location information may be transmitted in response to change in location or detection of a change in state of the electronic trolley lock device.

The tracking module of the electronic trolley lock device may also comprise a movement tracking module, comprising at least one of: an accelerometer sensor module, an infrared sensor module, a vibration sensors module, a magnetometer sensor module and a gyroscope sensor module. Movement of the device can indicate ongoing use. Embodiments may include both location and movement tracking.

The location tracking module may use any of the state of art hardware and software to enable identifying location of an electronic trolley lock device. Similarly, the movement tracking module may use any of the state of art hardware and software to enable identifying movement of an electronic trolley lock device.

The system controller 108 as depicted in FIG. 2, may additionally comprise a transceiver 144 and a trolley monitoring module 142. The trolley monitoring module 142 may comprise a location tracking module for tracking location of plurality of the trolleys and the movement tracking module for movement tracking of the plurality of the trolleys.

In an embodiment the trolley monitoring module 142 of the system controller 102 may communicate with the tracking module 128 of one or more electronic trolley lock devices as disclosed in the earlier embodiment of the present invention to monitor movement and location of one or more trolleys associated with electronic trolley lock devices.

The trolley monitoring module can be configured to monitor location of plurality of trolleys based on trolley tracking data received from the plurality of electronic trolley lock devices. The trolley tracking data may be location information or any data indicating a location where the trolley is placed. For example, the trolley tracking data may be a data which indicates, with which communication unit (gateway, server, system controller, device, cell tower etc.) the trolley lock device is connected or sending information.

The electronic trolley lock device can be formed having a base shaped to wrap around a handle of the trolley, a locking cable to fix the trolley at the trolley holding area, and a locking pin associated with the locking cable and to facilitate the locking functionality when inserted into the digital lock electronically activated lock. In an embodiment the base is hinged.

Further to the examples of the electronic trolley lock system as depicted in FIG. 1 and FIG. 2, the electronic trolley lock device can function in at least one or more operating states. For example, the operating states may be a locked state, an unlocked state, a returned state, an abandoned state, a sleep state and a switch off state.

In some embodiments the electronic trolley lock system may function in 2 or more states at a given time.

A practical embodiment of the electronic trolley lock device is implemented as a type of stat machine, with transition between states being in response to monitored operational data. An embodiment includes an operating state determining module 126 of the electronic trolley lock device. The operation state determination module determines the operating state of the electronic trolley lock device and transmit it to the system controller.

When the electronically activated lock associated with the electronic trolley lock device is locked, the electronic trolley lock device is deemed to be functioning in a locked state, thereby inhibiting use of the trolley.

Figure 7:
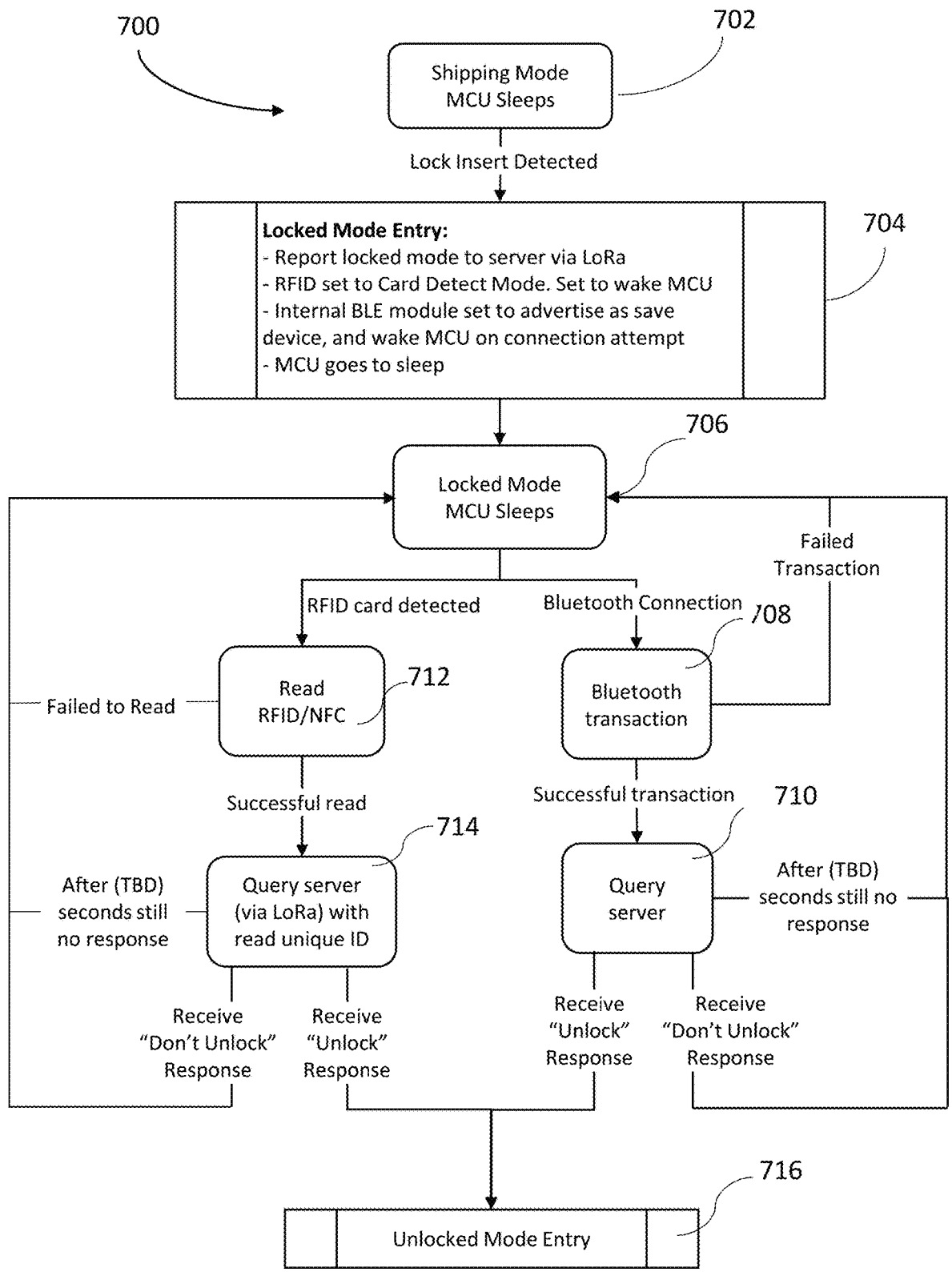
FIG. 7 is a flow diagram illustrating transition amongst various operating states (shipping state, locked state and unlocked state) of an embodiment of an electronic trolley lock device.

FIG. 7 is a flow diagram for illustrating transition steps 700 amongst various operating states such as shipping state, locked state and unlocked state according to an embodiment. At step 702, the electronic trolley lock device or the Microcontroller Unit (MCU) of the electronic trolley lock device is in shipping state. The shipping state is helpful to save power. For example, this may be an initial state for the devices being delivered. As soon as the shipping is completed, a trolley managers or trolley owners can assemble and fit the device on a conventional trolley. Once each device it is fitted and lock key is inserted the device transitions into Locked state. At step 704, locked state is enabled, and the updated state status is reported to a server or a system controller. At Step 704, on entry to locked mode, RFID and BLE modules of the device are also activated to detect any user action by using the user devices to request unlock the electronically activated lock associated with device. Depending on the user device used for unlocking, steps 708, 710 or steps 712 or 714 are followed.

Where, a Bluetooth Low Energy (BLE) based device is used for unlocking, a BLE module associated with the device detects the Bluetooth transaction and the Bluetooth transaction is authenticated at step 710 with help of a server or the system controller. After successful authentication, the device receives "Unlock response" whereas in case of unsuccessful authentication, the device receives "Don't unlock response". Also, in the absence of a reply signal from the server, the device will transition back to the locked state.

Where an RFID/NFC card is used for unlocking, stored information from RFID/NFC are retrieved by the electronic trolley lock device. The electronic trolley lock device can be configured to send an unlock request signal to the server based on the stored information. As shown in the figure, "Don't unlock response" or "Unlock Response" is received. In case of receiving "Don't unlock" response the device remains in the Locked state, whereas in case of "Unlock Response" device is unlocked, and the trolley is made available for use. in the absence of a reply signal from the server, the device will transition back to the locked state.

Alternatively, the abandoned state is detected based on tracking data received from the tracking module as well as status of a timer associated with the electronic trolley lock device. In accordance with present disclosure of the embodiment, the device controller of the one or more electronic trolley lock device configured to send abandonment alert notification to the system controller in response to detecting change in operating state to an abandoned state.

When the electronic trolley lock device functions in unlocked state, the electronically activated lock associated with the electronic trolley lock device is unlocked, thereby allowing use of the trolley.

When the electronic trolley lock device function is in an abandoned state, the trolley is detected to be abandoned at an unwanted trolley holding area. The detection of the trolley to be abandoned can be performed by one or more technique disclosed in embodiments of the present invention. In accordance with present disclosure of the embodiment, the abandoned state may be determined based on location of a trolley, movement of trolley and timing data. The location of a trolley, movement of trolley and timing data may be determined by the electronic trolley lock device alone or with the help of system controller. The location of a trolley, movement of trolley and timing data may be shared with the system controller frequently, occasionally or as per a request received from a system controller. A user using an electronic trolley lock device may also enable sharing of the trolley data comprising trolley information (such as the location of a trolley, movement of trolley and timing data etc.) and user information via the application running on the user device.

Figure 8:
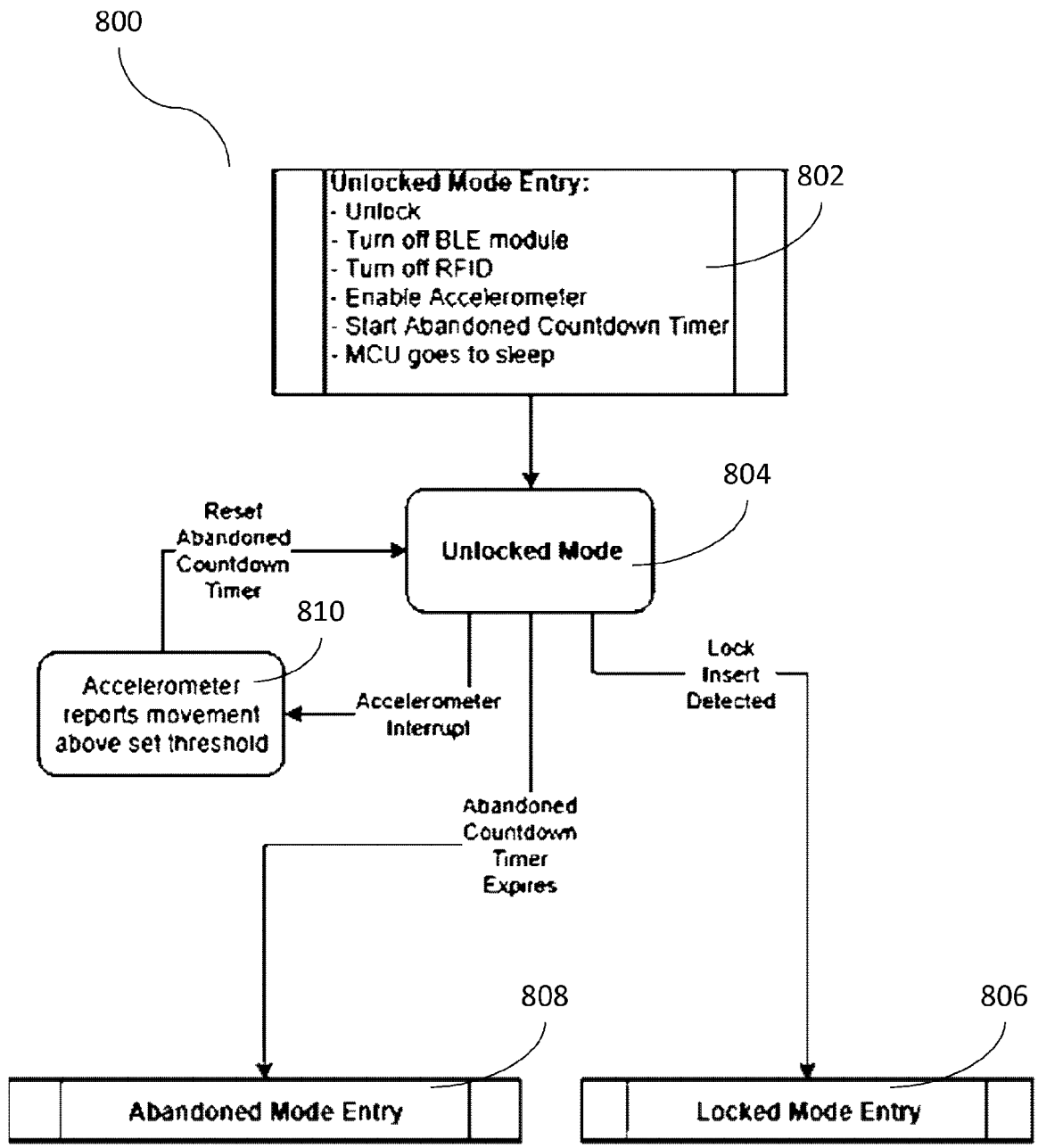
FIG. 8 is a flow diagram illustrating transition amongst various operating states (unlocked state, abandoned state and locked state) of an electronic trolley lock device according to an exemplary embodiment.

FIG. 8 is a flow diagram illustrating an embodiment of the process for determination of abandonment, and transition steps 800 from unlocked to abandoned or locked states. At step 802, when device enters into unlocked state, BLE/NFC and RFID modules can optionally be turned off to conserve power. The controller starts an abandonment countdown timer, so that after its expiry, the device can enter into abandoned state, as shown in step 808, if the countdown timer expires without detecting moment of the trolley. When the tracking module 128 of the device detects movement above a set threshold, for example from accelerometer sensors or location data, the abandonment timer is reset 810, however, when there is no movement detection, the abandonment counter continues. In an embodiment, prior to entering the abandoned state the device controller may output a warning signal, to enable the user an opportunity to avoid the trolley abandonment if, if fact this is still in use. The signal may be an audible alarm or signal transmitted to the user device to alert impending abandonment. For example, this signal may be output 30 to 10 seconds before the expiry of the countdown timer. At step 804, when device is in unlocked state, and lock key is inserted, the device goes in to the locked state, as shown in step 806.

Figure 9:
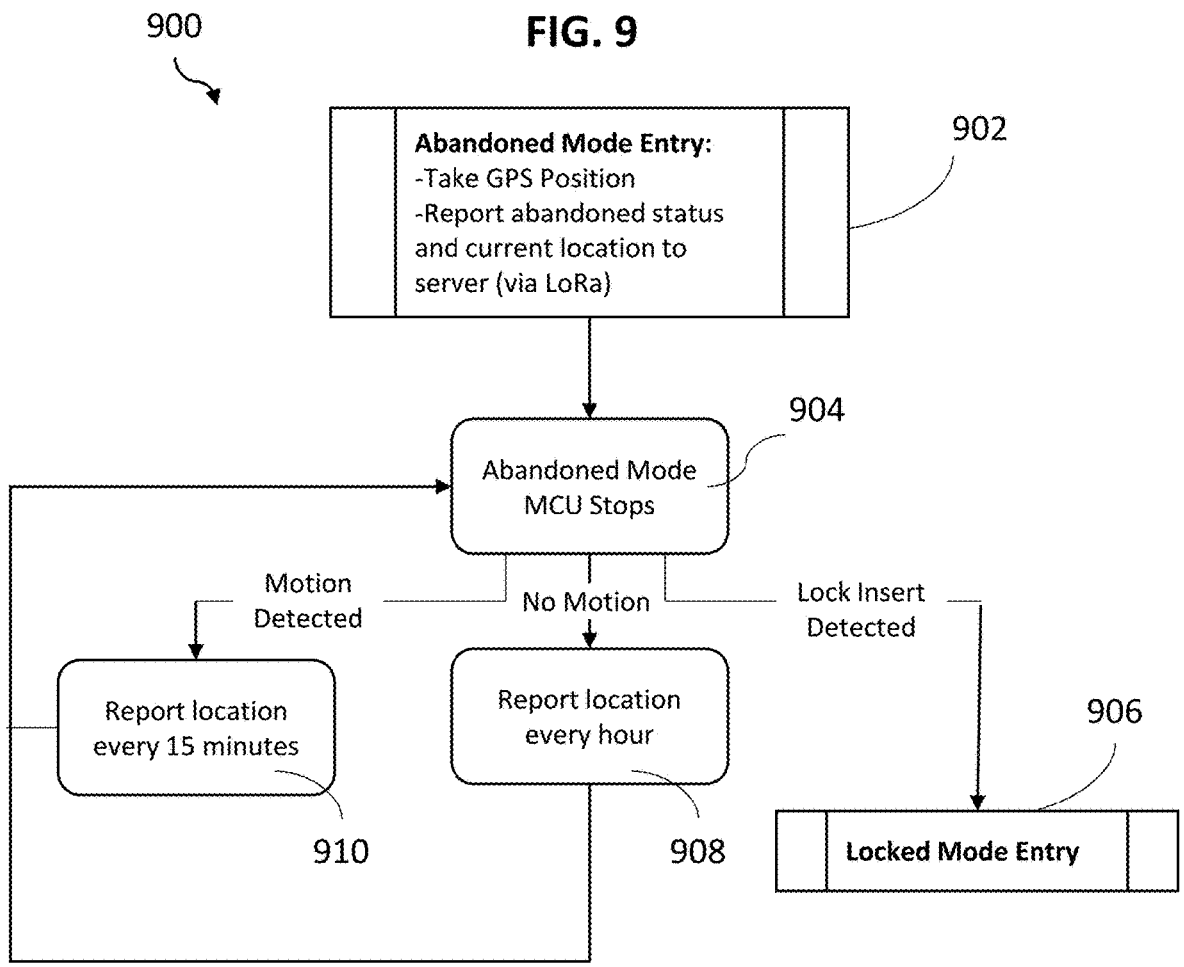
FIG. 9 is a flow diagram illustrating transition between operating states (abandoned state and locked state) of an electronic trolley lock device according to an exemplary embodiment.

FIG. 9 is a flow diagram for illustrating an example of transition steps 900 between abandoned states and locked state according to an embodiment of the invention. At step 902, when the device goes into abandoned state 904, it reports location to the system controller for example by sending location information determined by GPS module of the device or other location data. At step 904, once in the abandoned state, the controller enters a sleep mode. This helps conserve device batteries. When the device is in abandoned state, the trolley device transmits its location periodically as shown in step 910. Where a trolley location is determined to be outside a geofenced authorised use area or the trolley is out of range of any base stations, the trolley may also transition to the abandoned state. If any movement is detected, device reports location information to the system controller every 15 minutes. When the device is in abandoned state without movement being detected, as shown in step 910, location information is reported to the system controller every 1 hour. At step 906, it is depicted that, the device goes from abandoned state to locked state when locking key is inserted to the device.

All the states above are explained in respect of the device, however, these states are depicting status of the trolley based on its usage or status and can be referred and understood from that perspective.

When the electronic trolley device functions in the returned state, the trolley is detected to be returned to an authorized trolley holding area. Such detection can be performed by detecting physical location of a trolley, receiving a location ID corresponding to the authorized trolley holding area, detecting charging status, or a user input that a trolley is returned. Where trolley return bays or holding areas are also charging stations the charging status may also be used to indicate that a trolley is connected to a charging source and thus the trolley device may be considered that it is returned, and change its operating state to the returned state. In some embodiments the electronical trolley lock device may also function in default locked state whenever a trolley changes its operating status to a returned state.

When the electronic trolley lock device functions in a sleep state, the electronic trolley lock device operates with limited functionality. The limited functionality may be achieved by disabling one or more processes, modules or components of the electronic trolley lock devices. In an embodiment, a sleep state may be enabled when no change in location, or movement of a trolley is detected by the electronic trolley lock device, for example, after being in a holding area for an extended period of time or overnight. A sleep state can be activated using executing one or more instruction stored on a user device, for example defining timing (closing hours) to transition to the sleep state, countdown timer, or out of use storage location. An operator may also change the operating state to a sleep state before shipping electronic trolley lock devices.

When a lock key or pin associated with an electronically activated lock is inserted by a user, it may result in locking of the electronically activated lock. In accordance with present disclosure of the embodiment, when the electronically activated lock function is in sleep state and unlocked state (shipping mode), when a lock pin associated with an electronically activated lock is inserted by a user, this triggers a in change in operating state from sleep state a switch on state.

When the electronic trolley lock device function in a switch off state, the electronic trolley lock device of the trolley is in switch off state. In accordance with present disclosure of the embodiment, it may also be possible to switch on the electronic trolley lock device by sending instruction from the system controller.

The status of the trolleys may be determined based on trolley data received by the system controller according to one or more embodiments of the present invention.

For example, when a trolley is in locked state and not in returned state, the system controller may consider the trolley available for a trolley service. Thereby, a user can search the trolley using a web-based application on a user device. The user may also send a trolley service request or an unlocking request in accordance with one or more embodiments of the present invention.

Trolley information can include for each trolley or each electronic trolley lock device part of the system, any one or more of: trolley usage information, trolley location information, trolley movement information, store information, operating state of a trolley, unlock confirmation from a trolley, trolley identification number, connectivity type, trolley battery status and type of trolley etc.

User information may include any one or more of: user ID, user fingerprint information, payment credentials and user account information of plurality of registered users. When a user registers for a trolley service and is registered, user information may be shared with the system controller and stored on memory of the system controller.

In accordance with an embodiment of the present invention, the electronic trolley lock system is connected to plurality of user devices such as user device 1 (3002), user device 2 (3004) and user device N (3006).

The portable unit may be a passive NFC tag or a passive RFID tag, having no active processing components, and example of using a passive tag to unlock a trolley is shown in FIG. 11(B). In the embodiment the NFC or RFID tag acts as an identifier for a linked user account. Alternatively, the NFC or RFID tag or card may not be linked to a user account, if the trolley abandoned then the tag identifier is invalidated and will no longer work, and a further tag or card must be purchased. This uses the same incentive structure as the coin lock systems to encourage customers to return trolleys rather than abandon them.

FIG. 3 (A) is a schematic representation of an embodiment of a user device which may be used with an embodiment of the disclosed trolley lock system. As depicted, the user device is a portable scanning apparatus 300. The portable scanning apparatus comprises a processor 308, a portable scanning apparatus memory 302, one or more cameras 304 and a transceiver 306. The portable scanning apparatus 300 may be a mobile device, a wearable device, a tablet or any other similar hand-held device. The portable scanning apparatus memory stores information such as user information. The scanning module can scan a visual code associated with at least one of the trolley or the electronic trolley lock device. The portable scanning apparatus communication module transmits trolley data to the communication control module of the system controller.

FIG. 3 (B) is a schematic representation of another example of a user device which may be used with the disclosed system. As depicted, the user device is a portable unit 350. The portable unit 350 comprises a portable unit memory 352, one or more cameras 354 and a transceiver 356. The portable unit 350 may further comprises a processor 358. The portable unit may be a device with NFC capability, a device with RFID capability, a device with Bluetooth Low Energy (BLE) capability; and a device with LoRaWAN (Long Range Wide Area Network) based capability.

The portable unit may comprise, portable unit memory 352 storing user information, and a transmitter configured to do at least one of: transmit the user information to the wireless communication module of the electronic trolley lock device and transmit trolley data information including the user information to the communication control module of the system controller.

The visual code is at least one of a QR code (Quick Response code) and a bar code, wherein the QR code and the bar code store encrypted identification information corresponding to the electronic trolley lock device.

The authorisation module 108 of the system controller 102 may include one or more decoder to decode a visual code such as a bar code and a QR code or any other similar code. For example, where a user device sends an image of a bar code or QR code, this can be decrypted in the authorization module 108 of the system controller 102.

Embodiments of the electronic trolley lock system as disclosed in FIGS. 1 and/or 2, may further comprise a relocking module, configured to relock the electronically activated lock in response to detecting change in operating state to returning state. In embodiments where locking requires a mechanical connection, for example to a cable and locking pin attached to another trolley then automated relocking may not be feasible. However, if an embodiment included wheel locks then these may be electronically actuated to lock as well as unlock. For example, where a trolley has been abandoned outside a geofenced boundary for the trolleys, the system controller may send a signal to the electronic lock device to lock the trolley.

The electronic trolley lock system as disclosed in FIG. 1 and/or FIG. 2, enables a user to avail trolley service. For example, a plurality of conventional trolleys can be fitted with electronic trolley lock devices. Once a trolley is fitted with an electronic trolley lock device, it can be locked by a trolley operator to a trolley holding area. A trolley holding area may be a place where trolleys can be tied or fixed. The trolley can be tied or fixed with help of a locking cable. A locking cable one end may be connected to a stationary element at the trolley holding area. Another end of the locking cable can be tied or fixed at the electronically activated lock fixed to the trolley. Thereby, when the electronically activated lock is locked, this inhibits use of the trolley because the trolley is fixed.

When a user wants to use a trolley, the user may be able to choose from various unlocking mechanisms. For example, by choosing a user device of user's interest.

As depicted in FIG. 3 (A), a user may use a portable scanning apparatus (imaging device) such as a wearable, a mobile phone etc. For example, a phone, smartwatch or tablet may be configured as a portable scanning apparatus by installing a trolley software application. Once the application is installed, a user can scan a visual code associated with the electronic trolley lock device or the trolley, to unlock the trolley as described above, with reference to FIG. 4. The visual code will include trolley information such as a trolley ID encrypted on it. When the user scans the visual code using camera of the portable scanning apparatus, a scanning module scans the visual code. The information extracted from the scanning may comprises trolley information—for example a trolley identifier and optionally an identifier of a store or service affiliation for the trolley. The trolley information along with user information such as user login credential of the trolley application or other user information are sent as trolley data. The trolley data signal may be sent by the Portable Scanning Apparatus Communication Module 312 via transceiver 306 to the system controller 102.

The communication control module 104 of the system controller 102 receives a trolley data signal including trolley data identifying the trolley and the registered user. The authorisation module 108 is provided the trolley data comprising the trolley information and the user information and decodes the trolley information, if not decoded already. It may also be possible that the information extracted from scanning the visual code is decrypted by the trolley application installed on the portable scanning apparatus. In accordance with present disclosure of the embodiment, both the trolley application and a decoder part of the authorisation module may jointly decode the information extracted from the visual code to receive the trolley information.

As depicted in FIG. 3 (B), a user may use a portable unit such as a device with Bluetooth Low Energy (BLE) capability and a device with LoRaWAN (Long Range Wide Area Network) capability. When user wants to use a device with Bluetooth Low Energy (BLE) capability and a device with LoRaWAN (Long Range Wide Area Network) capability, user may perform various function. For example, a user may open a BLE application or LoRaWAN application installed on the device and request a trolley service when in vicinity to the electronic trolley lock devices.

When user uses a passive NFC tag or a passive RFID tag, a user may perform a tap event using a passive NFC tag or a passive RFID tag on the electronic trolley lock device associated with the trolley. In response to the passive tag tap, the electronic trolley lock device may be configured to perform a local authentication and unlock process, for example using a lookup table of authorized passive tag identifiers to for the tag identifier and unlock the electronic lock in response to a positive lookup response. On unlock, or after unlock, trolley data, including the tag identifier and trolley identifier, is generated by the electronic trolley lock device and transmitted as an unlock confirmation signal to the system controller, from which the system controller can associate the tag identifier with a use account for any appropriate transaction processing, such as deduction of a deposit or token. On return of the trolley (detected and/or confirmed by a second tap if electronic relocking) a return signal is also transmitted to enable disassociation of the user with the trolley and any account reconciliation.

Trolley data for transmission to the system controller can also be generated by the electronic trolley lock device, in response to detecting at least one of: a signal associated with one or more user commands on an interface of a device with Bluetooth Low Energy (BLE) capability in vicinity to the electronic trolley lock device the device, and a signal associated with one or more user commands on an interface of a device with LoRaWAN (Long Range Wide Area Network) capability.

In accordance with present disclosure of the embodiment, an unlocking request determining module 118 may receive a user unlock request comprising user information from a portable unit as disclosed in FIG. 3 (B). The unlocking request determining module 118 may communicate with the wireless communication module 114 to receiver user information.

The unlocking request determining module may further send user information along with trolley information stored on memory of the electronic trolley device as trolley data to the system controller. The wireless communication control module 114 may communicate with the communication network 122 for transmitting the information to system controller 102.

In some scenarios, the electronic trolley device only sends the user information and the system controller determines the trolley information based on location of the user, available trolleys in vicinity to the user and trolley stacking information etc. For example, a trolley determined in vicinity of the user device is unlocked and user can avail service. If there are a number of trolleys stacked at a trolley holding area, a first trolley available for released is unlocked. A user may also have options to choose a specific type of trolley, for example according to size, location etc. as well.

The trolley authentication process may involve validating whether the user information received relates to a registered user or not. If the user is not registered, it does not perform any further function or may send a don't unlock notification to the electronic trolley lock device.

In case the user is a registered user and is permitted, the trolley authentication process may further involve performing a transaction on a user account associated with the registered user based on the determined permitted use. In one embodiment the transaction is performed by deducting a first token from the user account associated with the registered user. The authentication module may be configured to perform the transaction.

The first token may represent a financial payment, reward points or a electronic token having some value.

In accordance with an embodiment of the present invention, associating a registered user with the electronic trolley lock device and storing the association in memory, is preceded by: receiving trolley data by the system controller from at least one of the user device or the electronic trolley lock device, authenticating the trolley data, sending by the system controller an unlock request to the electronic trolley lock device, and receiving by the system controller, the trolley data including the unlock confirmation from the electronic trolley lock device. Such implementation enables making sure the association of the registered user is correct.

In accordance with an embodiment of the present invention, once the trolley is returned and returned state in detected by the system controller, the registered user can be disassociated, and disassociation is stored in memory of the system controller. The user may be charged according the usage determined based on time, location etc.

In some practical implementations, a store may encourage users by providing incentives to return the trolley at authorised trolley holding area. In such case, the system controller may perform a reverse transaction by adding a second token to the user account associated with the registered user in response to detecting operating state of the electronic trolley lock device from an unlocked state to a returning state. In accordance with present disclosure of the embodiment, the first token deducted from the user account and second token added to the user's account.

In accordance with an embodiment of the present invention, authentication module can also be configured to, for each association of a registered user with an electronic trolley lock device, determine use permission for the trolley by the registered user based on authorization criteria and account status of the registered user. The account status may include data such as account balance, reward point balance, account category such as gold membership, penalty points, prior trolley use history etc. The authorisation criterion may vary for various account status and may by predetermined and stored in memory of the system controller. The authentication module may be implemented as a rules engine, with rules configurable for different system embodiments or service preferences.

The authentication module can be configured to monitor the state of a trolley while associated with a registered user based on the trolley data received from the electronic trolley lock device.

In accordance with an embodiment of the present invention various device event can be stored as event logs in memory of the electronic trolley lock device. The events may be stored in non-volatile memory of the electronic trolley lock device as well. In accordance with present disclosure, the events may be time-stamped as well. The events may include: operation state transitions, unlocks caused by locking outside a valid area, communication attempts, communications received, crossing of battery thresholds, (In Unlocked/Abandoned state) accelerometer activity and GPS coordinates measured etc.

In accordance with an embodiment of the present invention, the event log may comprise plurality of entries. Once the memory of the electronic trolley lock device containing the event log is full, new entries will overwrite older entries in the order of oldest first. The system controller may can retrieve and erase the event log over LoRaWAN (Long Range Wide Area Network).

In accordance with an embodiment of the present invention, trolley data sent by the electronic trolley lock device, radio message types to the system controller may comprise: the message type, the current state of the electronic trolley lock device, the battery voltage of the electronic trolley lock device and any errors or alerts (e.g. battery voltage "low").

In accordance with an embodiment of the present invention, the system controller may send one or more of the following data to one or more electronic trolley lock devices, as described in the following table.

| Message Type | Description | Expected Response from an Electronic Trolley Lock Device |
|---|---|---|
| ACK | Acknowledgement that a message from the locking unit was received | None |
| UNLOCK REQUEST INSTRUCTION | Instruction to unlock | ACK |
| DON'T UNLOCK REQUEST INSTRUCTION | Instruction not to unlock | ACK |
| FLASH LED | Instruction to flash LED (aids administrators in locating specific units) | ACK (and unit will flash LED) |
| STOP FLASH LED | Instruction to stop flashing the LED | ACK (and unit will flash LED) |
| SHIPPING STATE | Instruction to enter shipping state | ACK (unit will unlock and enter shipping state) |
| SEND LOG | Instruction to send the event log. Optionally, instructions to only retrieve events from and/or to a certain time | Full or partial Event log |
| CLEAR LOG | Instruction to erase event log | Unit erases event log, then sends ACK |
| SEND CONFIG | Instruction to send specified configuration settings (or all of them). Exception to this is the unique key. | Configuration settings |
| CONFIG | Instructions that define which configuration settings to change, and what to set them to. Unique ID and Key cannot be set | (Newly set) Configuration settings |

The user information of the plurality of the user may be stored on memory of the system controller, comprising at least one of: name, address, account details, prior usage history, account balance, location, application credentials, email id and device information of plurality of the registered users.

The electronic trolley lock devices are battery powered in several embodiments. For example, embodiments may use replaceable or rechargeable batteries. Some system embodiments include a charging station for at least one trolley holding area such that the battery for each trolley unit can be recharged upon parking or docking or nesting with other carts or trolleys in a trolley holding area with charge station.

Figure 12:
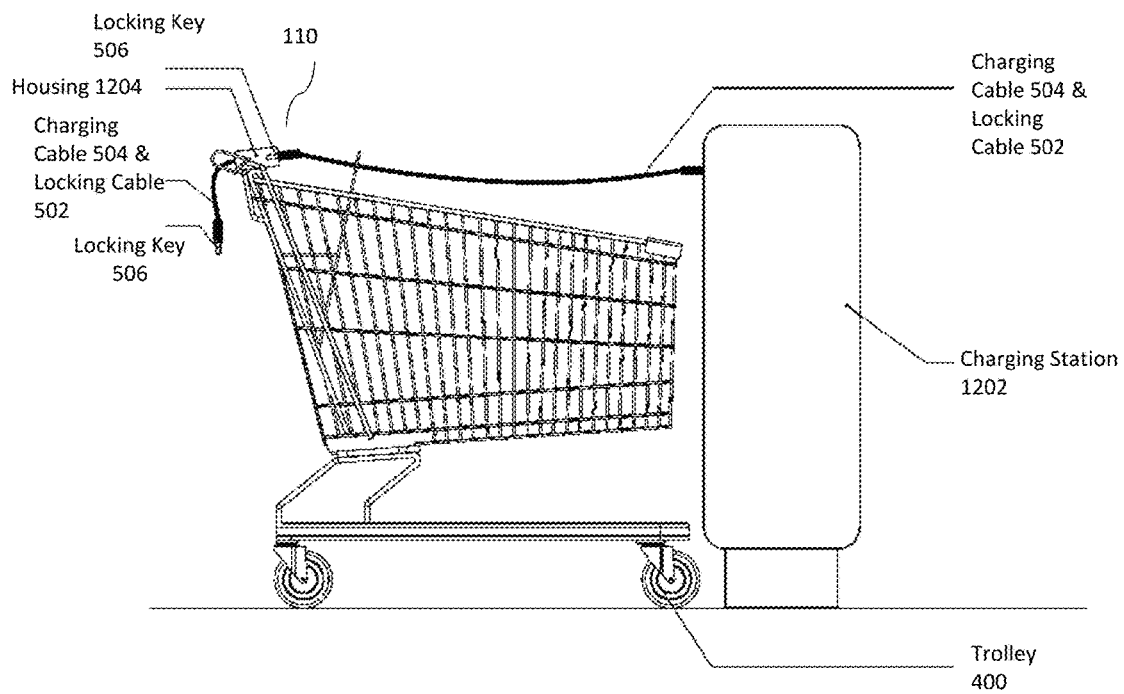
FIG. 12 illustrates a trolley being locked at a trolley holding area and an electronic trolley lock device being connected to a charging station according to an exemplary embodiment.
Figure 13:
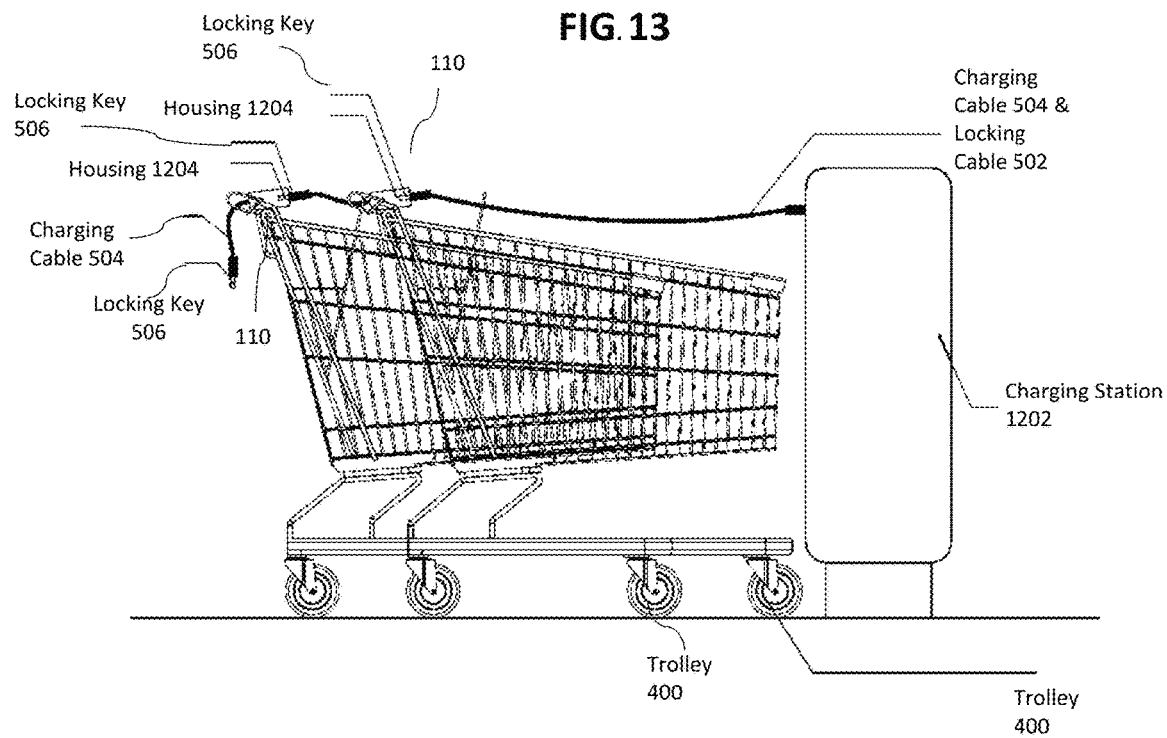
FIG. 13 illustrates multiple trolleys being docketed and locked at a trolley holding area and multiple electronic trolley lock devices being connected to a charging station according to an exemplary embodiment.

An example of an embodiment of a trolley lock system with charging station is illustrated in FIGS. 12 and 13. In this embodiment the charging station 1202, for example connected to a mains power supply, and the locking cable 504 includes an integral charging cable to provide power from the charging station to the electronic trolley lock device. In this embodiment, the locking key or toggle 506 includes a power supply output terminal which will engage with a cooperating power supply input terminal within the socket for receiving the locking key 506. FIG. 12 illustrates a trolley 400 being locked to a trolley holding area by the electronic trolley lock device 150 being connected to a combined locking and charging cable 504, 502, which is, in turn, connected to the charging station 1202. As depicted in the figure, both charging cable 504 and locking cable 502 are fitted or integrated together to provide both locking and charging functionality. For example, a combined cable may include an electronic power charging cable inside a braided locking cable, however any structure which provides a combination of a strong cable for locking and an electrical connection may be used. The locking key attached to the end includes an electrical connection to the power cable as well as a strong physical connection to provide the locking functionality. When the locking key is engaged in the socket of the trolley lock housing 1204, this both locks the trolley to the charging return bay bollard and forms an electrical connection to a charging module of the electronic trolley lock device. The Electronic trolley lock device also has, strongly attached to the housing, a locking 502 and charging 504 cable with attached locking key 506 for engagement with a further trolley nested with the trolley connected to the charging station 1202. The charging cable 504 is also electrically connected to the charging module in the trolley device to thereby enable power input to the power supply module to also be output to another trolley via the charging cable 504 attached to the housing, thereby providing locking as well as charging possibility to a further trolley.

FIG. 13 illustrates multiple trolleys 400 being locked in a trolley holding area and multiple electronic trolley lock devices being connected to a charging station according to an exemplary embodiment. As depicted in the figure, both charging cable 504 and locking cable 502 are integrated to provide both locking as well as charging functionality. One trolley (first trolley) closer to the charging station has an electronic trolley lock device (first device) being connected to the charging area directly through a long-integrated charging and locking cable (502 and 504), whereas the other trolley (second trolley) has an electronic trolley lock device (second device) being connected to the first device for locking as well as charging through a short-integrated charging and locking cable. The arrangement as suggested in the depicted figure, helps handling locking as well as charging of the number of trolleys stored compactly in a trolley holding area.

Figure 14:
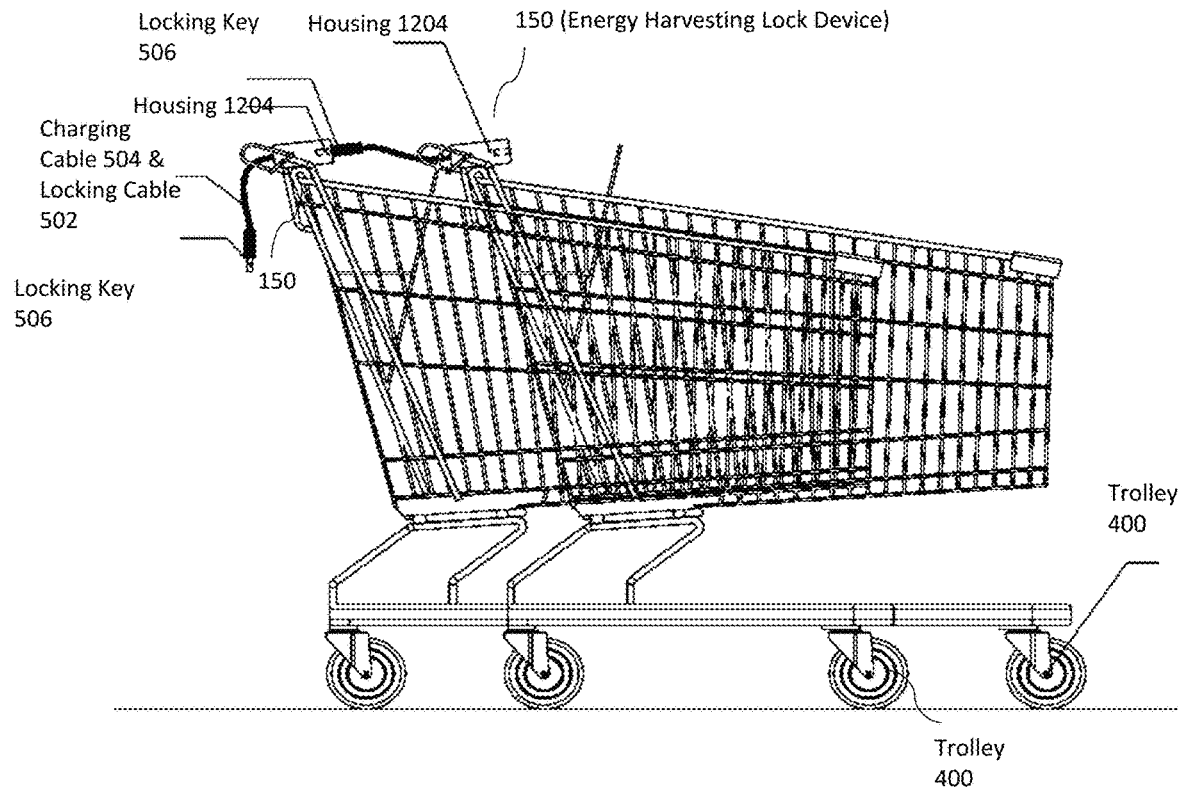
FIG. 14 illustrates an electronic trolley lock device being connected to another electronic trolley lock device with energy harvesting feature for charging according to an exemplary embodiment.

In an alternative example of the system, each trolley lock device 150 includes components mountable to the trolley to enable self charging of the battery of the electronic trolley lock device. The self charging functionality may be included in the electronic device 150 and attached to the housing 1204 for mounting to the trolley. For example, the energy harvesting may utilise solar, wind, friction, movement etc. fed electric power generators. FIG. 14 illustrates an example of such an electronic trolley lock device 150 being connected to another electronic trolley lock device with the energy harvesting feature. In this embodiment the cable may be a combined charging and locking cable to allow for sharing of power between connected trolley lock devices. Alternatively, the cable may be for locking only and each unit harvests energy for its own charging only.

Figure 15:
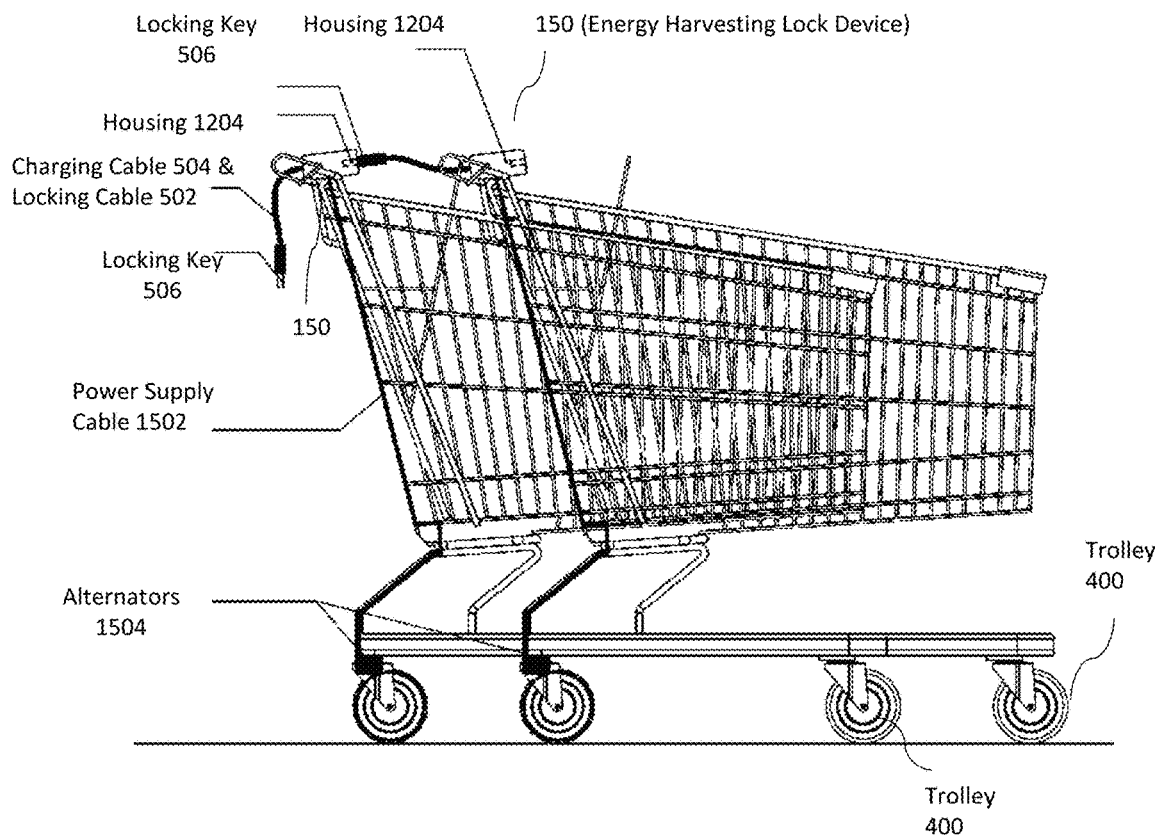
FIG. 15 illustrates multiple electronic trolleys lock device docketed and facilitated with energy harvesting feature by using alternators for self-charging according to an exemplary embodiment.

In another self charging embodiment, the trolley mounted unit includes an alternator attached to at least one wheel chamber of the trolley. Power to charge the battery is generated via the wheels, while the trolley is in motion. This power is supplied by a cable to the trolley lock device 150 mounted on the trolley handle. For example, wires can run from the alternator along or through the trolley chassis and handle bar into the handlebar mounted unit and a battery charging unit therein. Thus, energy can be harvested during trolley use, from movement the wheels, to recharge the trolley locking device battery. FIG. 15 illustrates multiple electronic trolley lock device being connected to each other and the charging components mounted to the trolley, to facilitate energy harvesting. In this embodiment alternators are utilised for self-charging. As shows in FIG. 15, alternators 1504 are connected to wheels 400 of the trolley. Bower generated by the alternators is provided to the electronic trolley lock device via power supply cable 1502. This embodiment may utilise a combined locking and charging cable, with the battery charging circuit enabling transfer of power from its battery to that of another trolley connected via the combined charging and locking cable. In other embodiments the cable may only be for locking and all trolleys may independently charge.

It should be appreciated that for a battery-operated system embodiment where replaceable batteries are is used, no external charging is required. However, in this embodiment the device controller for each trolley device may implement a battery monitoring function. The battery monitoring function may periodically determine the battery status and transmit trolley data with a low battery notification to the system controller if the battery power drops below a predetermined threshold.

When trolleys fitted with the electronic trolley lock device are connected, parked or docked or nested with one another and or to the charging station or base station, the server and or base station receives a signal that all trolleys are accounted for. For example, based on detection of all trolleys in the returned state by the server, or transmission of lists of trolley identifiers of all trolleys at each charging station, the System controller may transmit a signal to a centre operator or trolley contractor/service provider to this effect. Where there is no need for a base station, communication is achieved via a server.

A preprogramed location can be installed for each cart or trolley parking bay and or store site. In some embodiments, any trolleys devices on trolleys not parked or docked or nested or returned to a designated parking bay or bays may also emit a signal that is received by the base station and or server. For example, trolleys not returned to designated bays within a car park may be within range of base stations or gateways and their location determined based on gateways in range and triangulation. Where trolleys are abandoned out of range of gateways, GPS location data may be transmitted by the electronic trolley lock device, for example using a 3G wireless or LoRa. This location data may be transmitted individually by each trolley on an ad hoc basis possibly periodic, or at pre-programmed times, depending on installed system preferences. Alternatively, the system controller may signal to all abandoned trolleys to request GPS location information. Location information can then be sent to parties collecting trolleys, for example a designated cart or trolley contractor or store site, company office or all, depending in the tier of subscription to the trolley monitoring service.

In accordance with an embodiment of the present invention, the system controller may enable various vendors to subscribe to a multi-tier subscription service, to receive reports that show cart or trolley locations in real time on a map, within specific radius of a store, real time location or status of carts or trolleys while in use in store, detail of tracking time in store, and store route, reports on user data, including time trolley or cart was unlocked and time cart or trolley was returned to parking bay and information with respect to nested or docked with other trolleys.

An advantage of some embodiments of the disclosed system is it eliminates the need for coins or physical tokens to unlock carts or trolleys, thereby providing a smooth operation of a coin less or physical token less trolley system for users with the use of a mobile app.

In one cases, the system controller does not authenticate the user and may unlock the electronically activated lock straightaway. The unlock may be controlled by the electronic lock device in this embodiment. An advantage of this embodiment is trolleys are able to be unlocked even if there are communication delays or outages with the system controller. In such cases, the electronic trolley lock device stores data regarding the unlock transaction, including the user information. This transaction information is transmitted to the system controller for further processing after unlock has occurred. The system controller may process the transaction information and transmit restricted user information to the one or more electronic trolley lock devices if an authorisation problem is identified from analysis of the user's account.

In another case, authentication is performed based on the user information and restricted user information stored on memory of the electronic trolley lock device. The restricted user information may comprise, a list of users or user accounts not permitted to use trolley service.

FIG. 5 illustrates exterior view of an electronic trolley lock device according to an exemplary embodiment. The electronic trolley lock device comprises a locking cable 502, a charging cable 504, locking key 506, connectors 516, bar-code 514, QR code 512, lock 112 and an NFC tap screen 510. In this case the electronic trolley lock device can be unlocked by scanning the QR code or a barcode, or by tapping an active NFC tag device on the electronic trolley lock device with NFC capability. When the electronic trolley device receives the unlock request it releases the lock 112 and change into the unlock state as described in earlier embodiments. As depicted in the figure the electronic trolley lock device can be charged by a charging cable 504. One end of the charging cable is connected to a charging source. The connectors 506 are used to package various components of the electronic trolley lock device into a single unit or housing.

Figure 6:
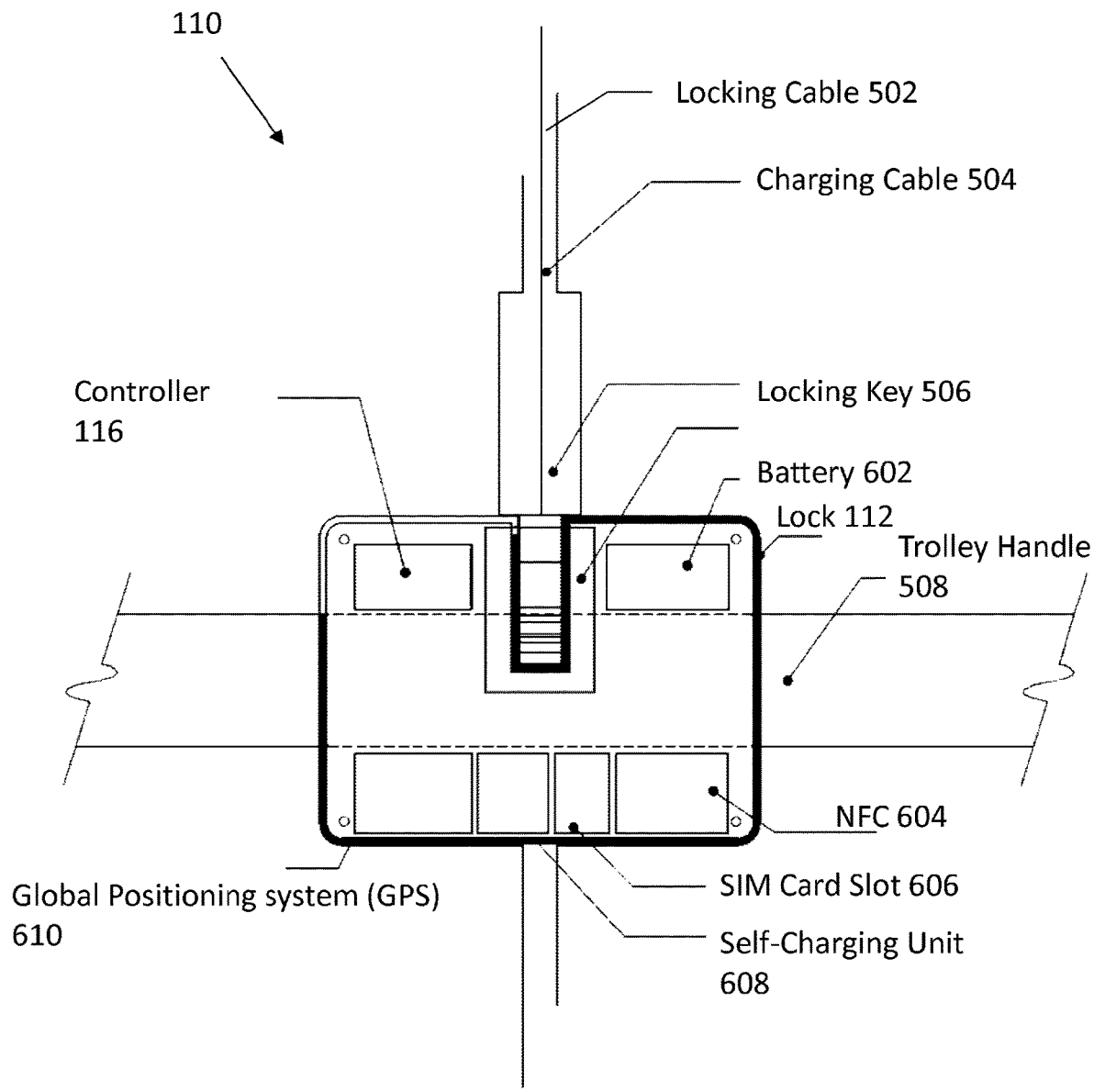
FIG. 6 illustrates an interior view of an embodiment of an electronic trolley lock device.

FIG. 6 illustrates interior view of an electronic trolley lock device according to an exemplary embodiment. As depicted in the figure, electronic trolley lock device may comprise global positioning system (GPS) 610, a controller 116, SIM card slots 606, a self-charging unit 608, an NFC 604, battery 602, a lock 112, locking key 506, a charging cable 504 and a locking cable 502. The lock 112 is an electronically activated lock. The electronic trolley lock device 110 is fitted on trolley handle 508 of the trolley for locking the trolley at a trolley holding area.

Figure 16:
FIG. 16 A-C illustrate various interactive user interfaces for registering a user to a trolley service.
Figure 16:
Figure 16:
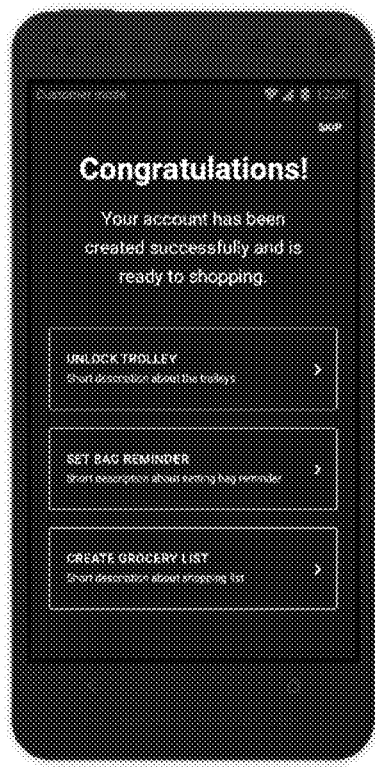

FIG. 16 illustrates various interactive user interfaces for registering a user to a trolley service. As depicted in the figure, a mobile application be used by a user to use the trolley service. A plurality of users can register themselves using their login credentials. Users can also add payment details of their cards during their registration or later. When a user is registered, the application displays an account setup confirmation and allow user to use the trolley service. As shown in FIG. 16 (C), user can use "unlock trolley" menu available on the application when requiring unlocking a trolley. In this use case, a user can use NFC enabled, RFID enabled, BLE enabled or LoRaWAN (Long Range Wide Area Network) enabled mobile device or manually enter the identification number associated with an electronic trolley lock device or a trolley.

Figure 17:
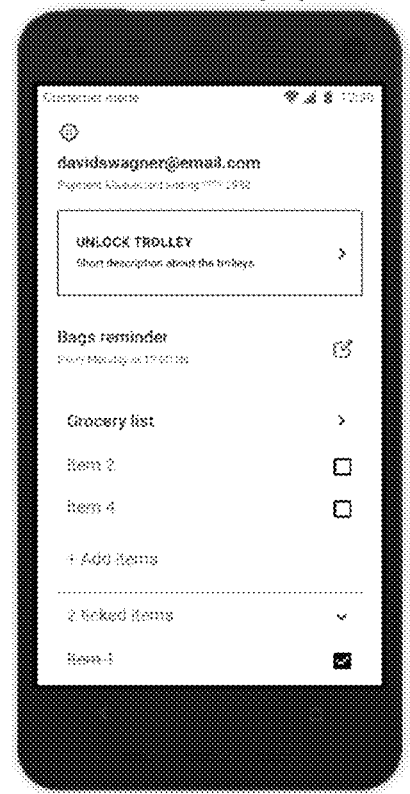
FIG. 17 A-D illustrate examples of three trolley unlocking mechanism according to an exemplary embodiment.
Figure 17:
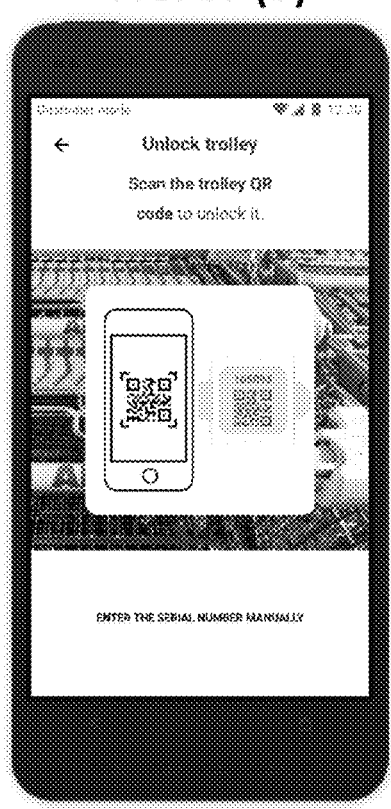
Figure 17:
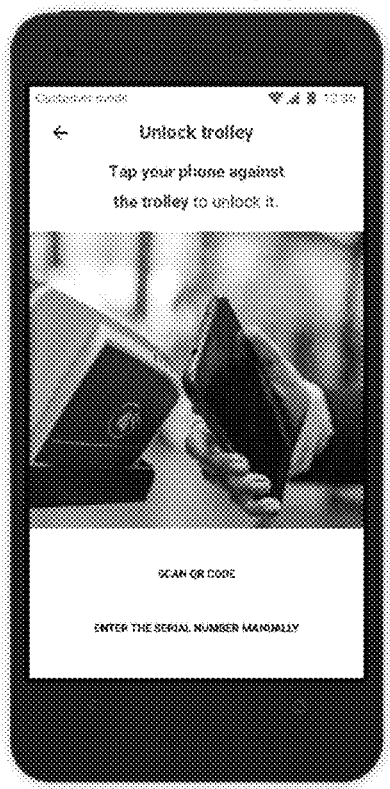
Figure 17:
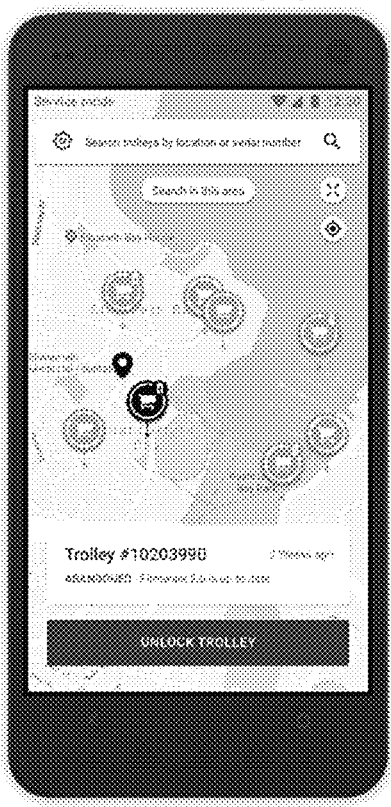

FIG. 17 illustrates various trolley unlocking mechanism according to various exemplary embodiments of the present invention.

FIG. 17(A) depicts that a user has to sign in to use a trolley service using a mobile application. When user completer the registration and sign in to application, plurality of menus are displayed to the user in the mobile application. When user presses unlock trolley menu on the application, user may choose unlocking ways from plurality of mechanism.

FIG. 17 (B) depicts, when a user chooses a QR code based unlocking mechanism, the camera of the mobile device is activated to scan a QR code associated with an electronic trolley lock device or a trolley. Once the scanning is completed, the trolley data is sent to the system controller for authentication. In response to successful authentication, unlock request is shared with the trolley lock device and the trolley lock device unlocks the electronically activated lock and changes its operating state to unlocked state.

Similarly, FIG. 17 (C) depicts that a mobile device with NFC capability can also be used as mechanism of unlocking. A user may an NFC based mobile application and enables NFC associated with the mobile device. When user taps the mobile device, user information is transmitted to the electronic trolley lock device. The electronic trolley lock device prepares the trolley data including the user information and the trolley information stored on the trolley lock device and send a user request to the system controller comprising the trolley data. In response to successful authentication, the system controller requests the electronic trolley lock device an unlock request and the electronically activated lock associated with the trolley lock device is unlocked, thereby allowing the user to use the trolley.

Similarly, FIG. 17 (D) depicts that a user can view availability of various trolleys through a mobile application. In response to receiving a user request for viewing the available trolleys for a given area or a store, the system controller sends trolley information based on determining available trolley in locked state and their corresponding location, to the mobile device to depict on the mobile application. The user can see the position of the trolley and locate the trolleys and arrange sending unlock instruction by tapping on a trolley displayed on the mobile application or by using an unlocking mechanism disclosed in one or more embodiments of the present invention. A similar feature may be used by trolley service provider for locating abandoned trolleys, both within and outside the authorized use area.

Figure 18:
FIG. 18 A-D illustrate examples of various notifications provided to a registered user according to an exemplary embodiment when a trolley service is availed.
Figure 18:
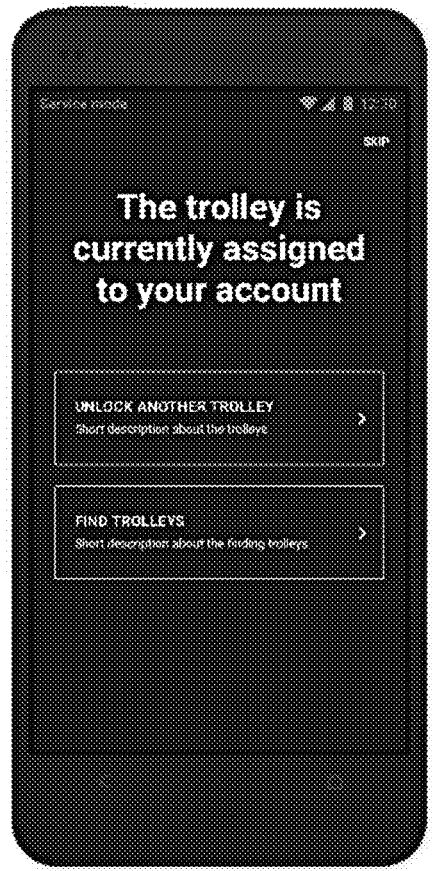
Figure 18:
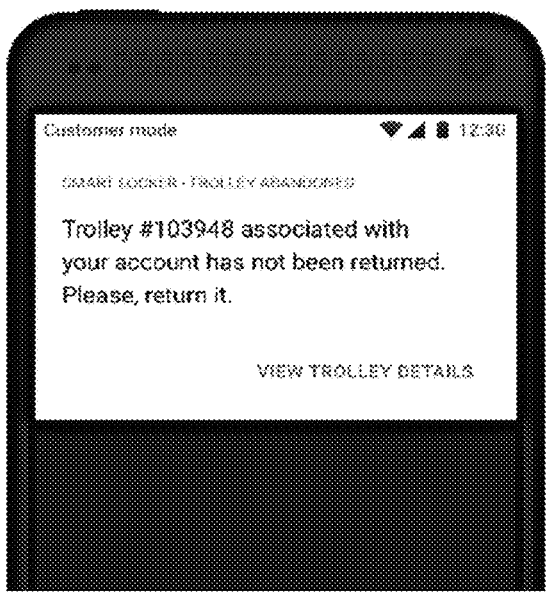
Figure 18:
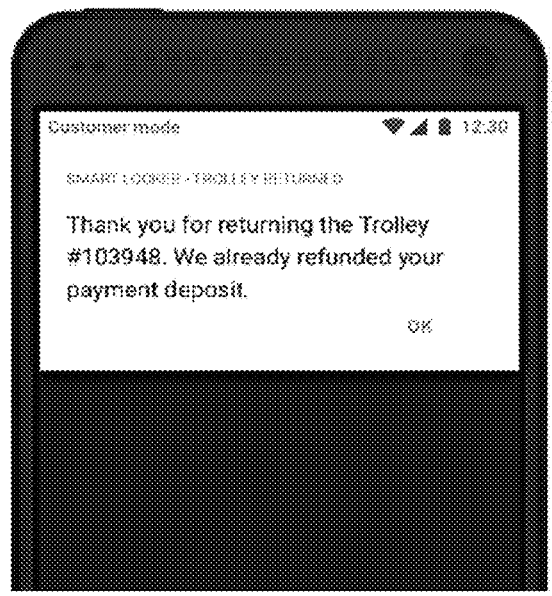

FIG. 18 illustrates various notification provided to a registered user according to an exemplary embodiment when a trolley service is availed.

FIG. 18 (A), depicts that when a trolley is unlocked, a notification is provided to the user that a trolley is unlocked, and it is ready for shopping.

FIG. 18 (B), depicts that the trolley is currently assigned to a user account, thereby confirming that user now use the trolley.

As depicted in FIG. 18 (C), mobile application can also notify user that a trolley is not returned. Specifically, this may help user to become aware that a trolley is still assigned to the user account and it is supposed be returned to a trolley holding area by the user.

As depicted in FIG. 18 (D), when a trolley is returned in accordance with one or more embodiment of the present invention, the mobile application notifies to the user that a deposited amount is refunded.

Figure 19:
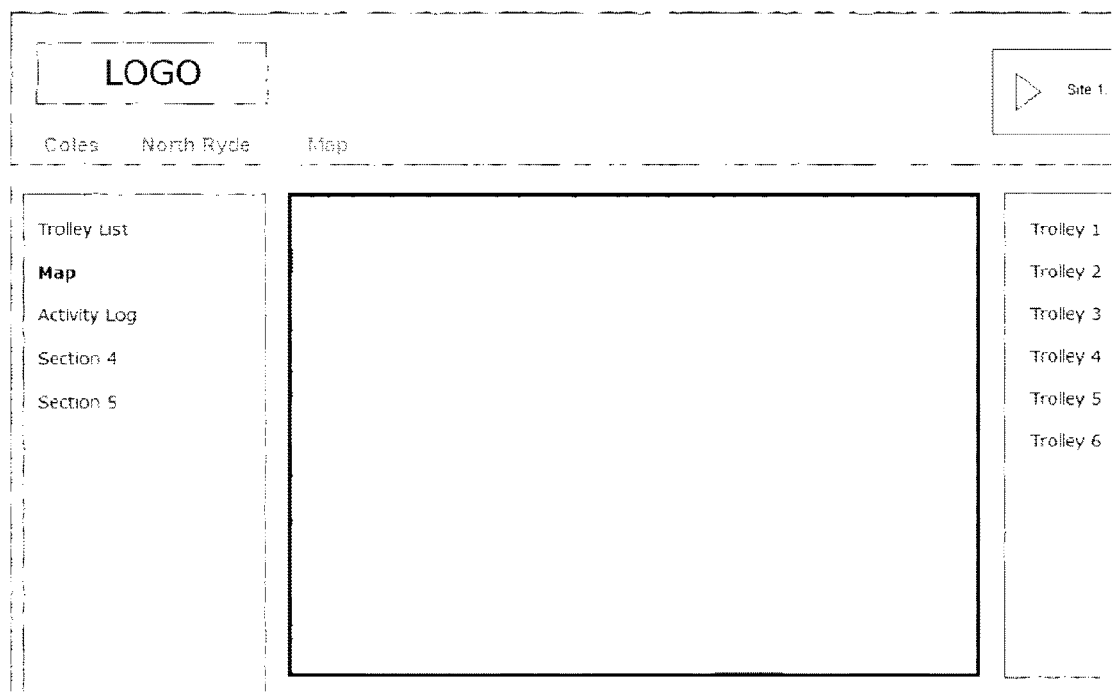
FIG. 19 illustrates an interactive user interface for the system with a map on which trolleys may be represented.

FIG. 19 illustrates an interactive user interfaces depicting status of various trolleys on a map. As depicted in the figure, a user, a store manager, a trolley manager or an administrator may select a store (e.g. Coles) and location (e.g. North Ryde) to see various trolleys associated with the store on that location. As depicted, activity log for the trolleys can also be viewed as per viewing rights provided to a viewer.

Figure 20:
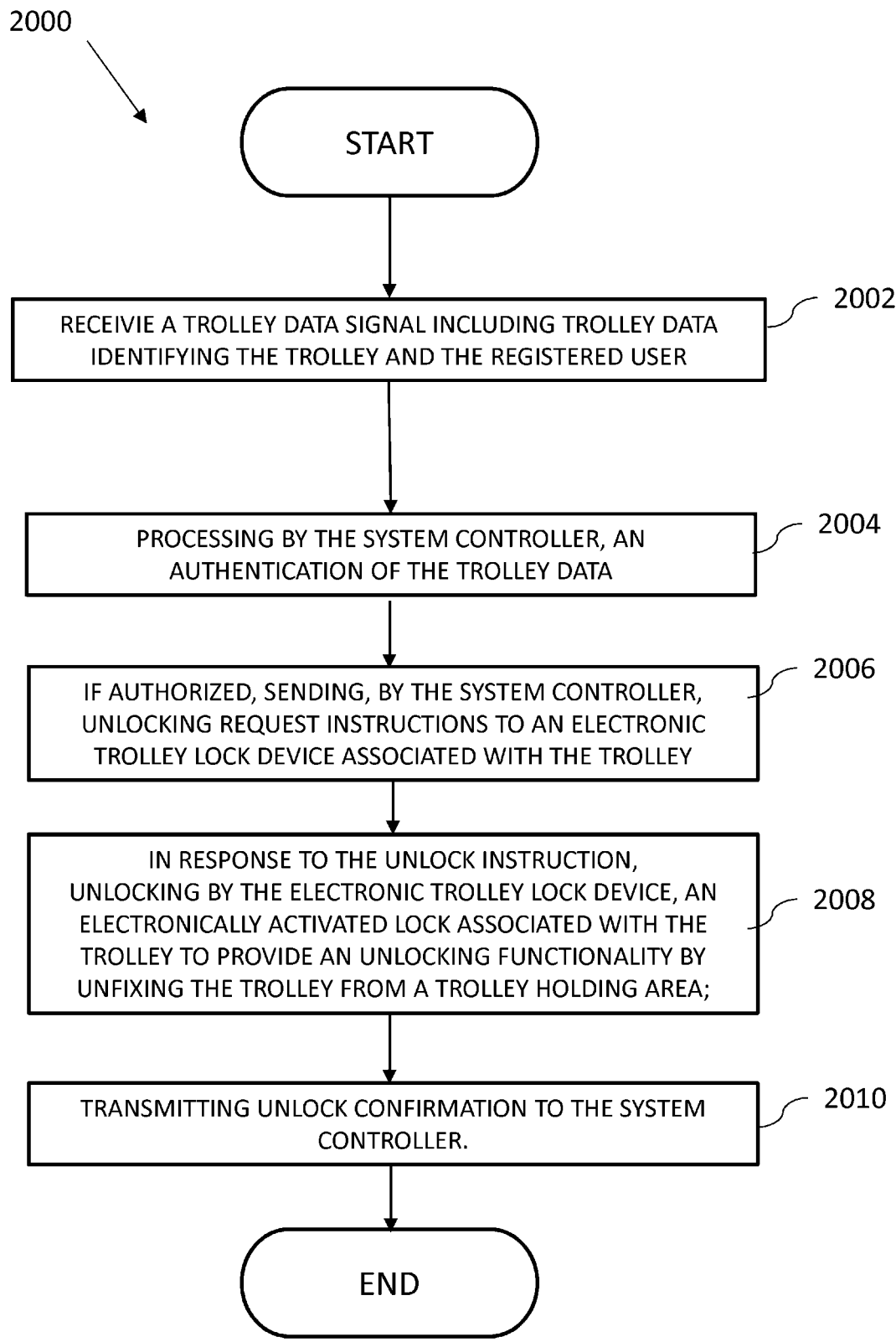
FIG. 20 is a flow diagram illustrating an example of an unlock process.

FIG. 20 is a flow diagram illustrating implementation steps 2000 of a process performed by the system controller and trolley lock device for unlocking a trolley using a user device such as a mobile phone, smartwatch etc. In this process begins at step 2002, with a trolley data signal including trolley data being received by the system controller. The trolley data signal identifies the trolley and the registered user requesting use of the trolley. This signal, in this example is, derived from one or more actions performed by the registered user to initiate borrowing a trolley.

At step 2004, an authentication of the trolley data is processed by the system controller.

At step 2006, if authorized, unlocking request instructions to an electronic trolley lock device associated with the trolley is sent by the system controller.

At step 2008, in response to receiving the unlock instruction, an electronically activated lock associated with the trolley is unlocked by the electronic trolley lock device, thereby providing an unlocking functionality by unfixing the trolley from a trolley holding area. At step 2010, unlock confirmation to the system controller as trolley data is transmitted by the electronic trolley lock device.

Figure 21:
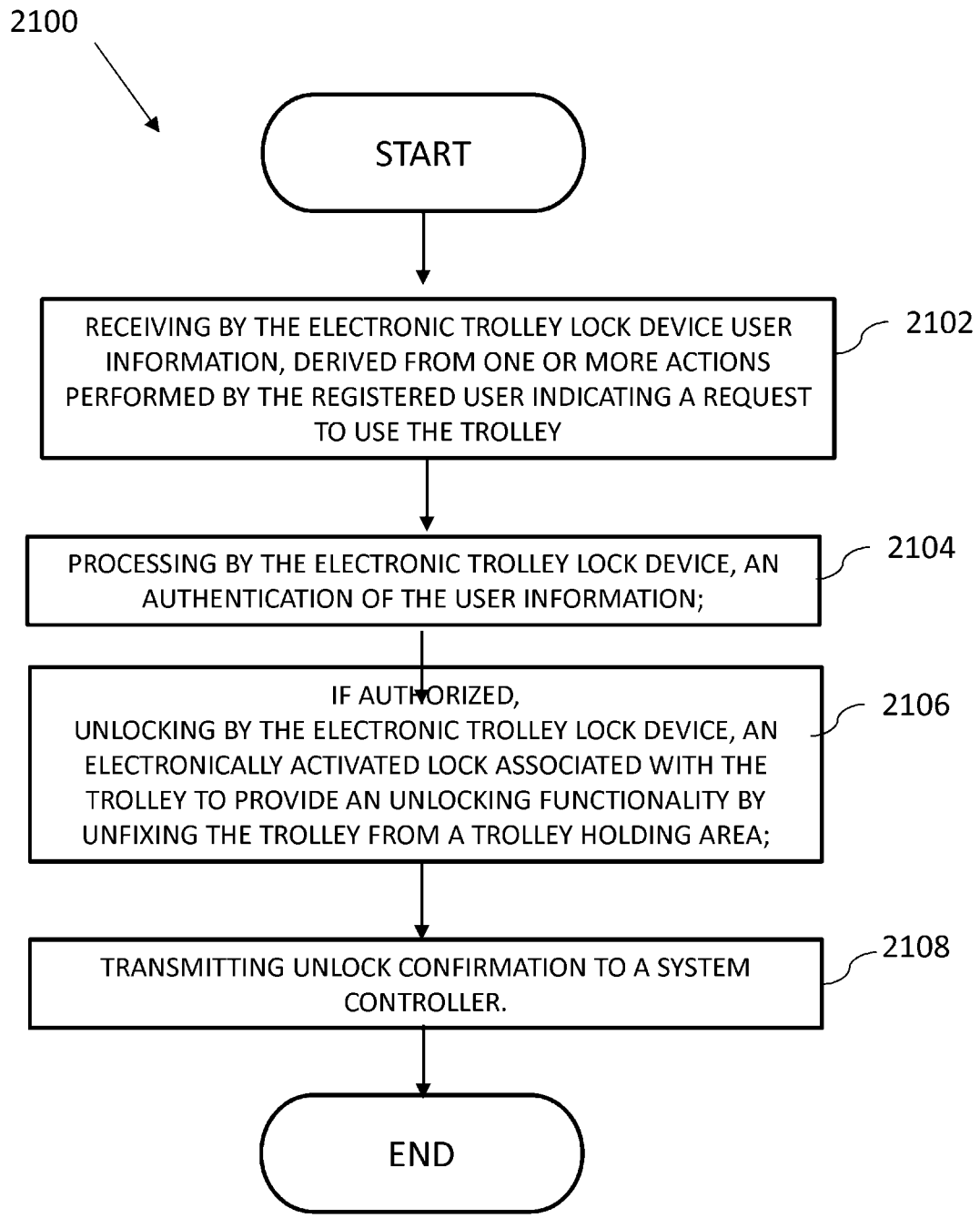
FIG. 21 is a flow diagram illustrating an example of another unlock process.

FIG. 21 is a flow diagram illustrating implementation steps 2100 of the present invention according to an exemplary embodiment. At step 2102, user information, derived from one or more actions performed by the registered user indicating a request to use the trolley is received by the electronic trolley lock device. At step 2104, an authentication of the user information is processed by the electronic trolley lock device. At step 2104, if authorized, an electronically activated lock associated with the trolley is unlocked thereby providing an unlocking functionality by unfixing the trolley from a trolley holding area. At step 2108, unlock confirmation to a system controller is transmitted.

Figure 22:
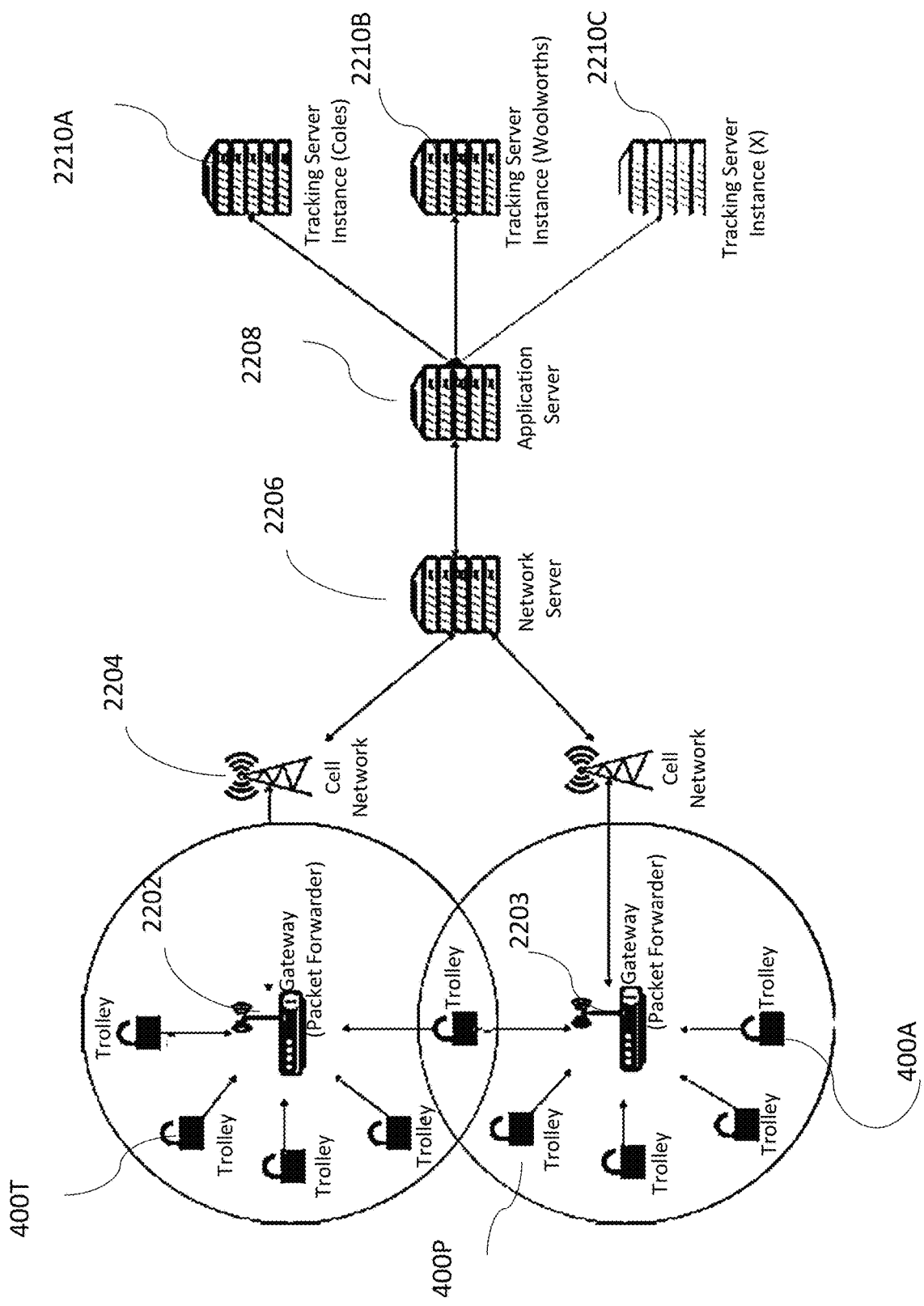
FIG. 22 is an example of an implemented system architecture for an embodiment.

FIG. 22 is a block diagram illustrating system architecture of an embodiment of the discloses system. In the illustrated architecture, all the electronic trolley lock devices are part of the trolleys (for example, such as 400A, 400P and 400T) are on a private LoRaWAN (Long Range Wide Area Network) network. The electronic trolley lock devices are configured to connect to one or more gateways (such as gateway 2202, 2203) for communication via the communication network. The Gateways 2202, 2203 in this example are responsible for receiving data from the electronic trolley lock devices 400A, 400P, 400T and forwarding that data to the network server 2206, and also receiving data from the network server 2206 and transmitting this to the trolley lock devices 400A, 400P, 400T. The electronic trolley lock devices 400A, 400P, 400T may not be associated with a specific gateway 2202, 2203. Instead, any data transmitted by the electronic trolley lock devices 400A, 400P, 400T may be sent to all gateways 2202,2203 and each gateway which receives a signal will processes it and send it to network server 2206.

Furthermore, the gateways 2202, 2203, configured as packet forwarders, may receive messages with encrypted payloads from electronic trolley lock devices transmitted over LoRaWAN (Long Range Wide Area Network). The gateway 2202, 2203 shall encapsulate and forward the message to the network backend using MQTT over the 4G network or any similar cellular based technology, together with metadata such as signal strength (RSSI) and signal-to-noise ratio (SNR). Periodically the gateway 2202, 2203 may also send some status information about itself, for example, the number of packets processed.

Similarly, Gateways 2202, 2203 may also receive messages from the network server 2206 and distribute these to the electronic trolley lock devices within a range shortly after their next communication with the gateway. After each message transmitted by the electronic trolley lock device, there will be two receive windows, for example, one at 1 second after the transmission, the other after 2 seconds. The advantage of providing limited received windows is this reduces the window in which the device transceiver muse be operating at full power, and hence conserve battery power.

The network server 2206 may filter duplicate packets from gateways 2202, 2203 (where a Locking Unit is in range of multiple gateways), do security checks and send acknowledgements to the gateways. For example for security the network server may decrypt the payload using the network key to ensure the packet is valid and originates from a trolley device. If decryption fails, the message will be dropped. De-duplication can involve generating a hash of the message payload (the metadata will vary depending on the receiving gateway, so shall be ignored for the purposes of de-duplication) and comparing it to other packets received in the immediate window. Gateway processing and network delays mean that duplicate messages will not arrive at the network server simultaneously. In order to collect the metadata added to the message by each gateway, the network server can buffer duplicates for a short period of time. That time must be short enough to give the application enough time to reply to a message in the receive window that is first opened 1 second after the original transmission. If a packet is intended for the application server 2208, the network server 2206 may send the packet to that server.

Allowing all gateways 2202, 2203 to send the same packet to the network server 2206 removes the need for handover between gateways and greatly simplifies communication when the trolleys are moving. Further the network server may be provided access to device state information and before a message for the device, the device's state will be updated and the network server can add a downlink template to the message which can be used to send a downlink message back to the device appropriate for the device state.

In accordance with an embodiment of the present invention, the gateways and the network server (the system controller as described in the earlier embodiments) may communicate with application servers to implement other use business use cases. The application server may decrypt the messages received from the network server 2206 and route them to the appropriate tracking server (such as 2210A—retailer 1, 2210B—retailer 2, 2210C shopping centre management etc.) for enabling deriving various business applications. The tracking server 2210A-C may store the business logic or instruction as a software according to supermarket chain and/or business need.

Figure 23:
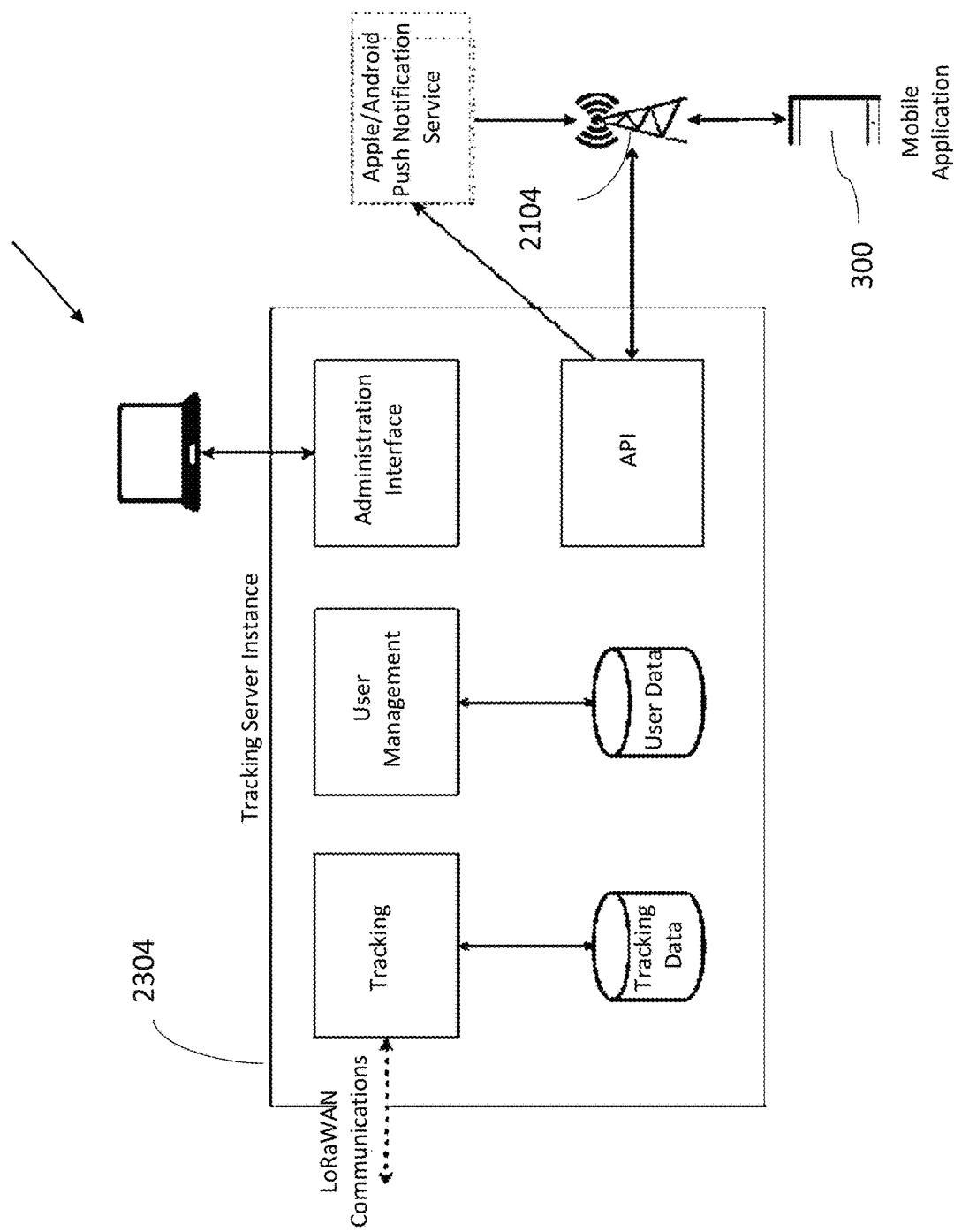
FIG. 23 is an example of system architecture for a tracking server in more detail.

FIG. 23 is a system architecture describing the tracking server as depicted in FIG. 22, in more details in accordance with an embodiment of the present invention. The tracking server 2210A comprises a tracking management, user management and administration interface modules to facilitate one or other functionality as disclosed above. It also stores information such as tracking data and user data for examples: trolley information and user information as described above. The tracking server may also directly communicate with a user device such as a mobile device having a mobile application installed thereon as per store or business requirement. For example, incentives or rewards or other information may be offered to the user via the mobile device.

In yet another embodiment of the present invention, the electronic trolley lock system may be used for other similar trolley forms such as a cart, a dolly, a stroller, buggy, wheelchair etc. A key advantage being the ability to monitor locations and usage of such conveyances, particularly where such items are used temporarily by a variety of different users, for example at an airport, zoo, campus or shopping centre.

In the embodiment of the figures as disclosed in the present invention, various software processes are shown implemented as separate modules. The invention is not limited to this. The software may be implemented in any convenient software architecture, routines or sub routines, or any other architecture that can implement the functionality described in this description.

Variations and modifications may be made to the parts previously described without departing from the spirit or ambit of the disclosure.

The system and method can be implemented using computer processing and memory resources in the form of one or more network connected servers and databases, these hardware resources executing software programmed to implement the functions as described above. Alternatively, the computer processing and memory resources may be network accessible distributed "cloud based" resources, executing software to implement the system functionality as described above. Some embodiments may utilise a combination of dedicated hardware and shared resources. A variety of different system architectures are contemplated within the scope of the present disclosure.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. An electronic trolley lock system comprising:
   a communication network connected system controller; and a plurality of electronic trolley lock devices, each one of the plurality of electronic trolley lock devices configured for installation on a trolley, each electronic trolley lock device comprising:

an electronically activated lock associated with the trolley, so when locked inhibits use of the trolley and when unlocked allows use of the trolley;

a tracking module configured to monitor movement and location of the trolley, to determine a location of the trolley lock device;

a wireless communication module; and a device controller, comprising a processor and memory, the device controller being configured to:

transmit trolley data to the system controller via the communication module; and in response to receiving an unlock request via the wireless communication module, unlock the electronically activated lock, and the system controller comprising:

memory storing:

for each of the plurality of electronic trolley lock devices associated with trolleys, one or more data elements; and registered user information; and processing resources programmed with instructions executable to implement a communication control module configured to control communication with at least one of:

each of the electronic trolley lock devices via the communication network; and user devices associated with registered users via the communication network; and an authentication module configured to:

associate a registered user with an electronic trolley lock device of a trolley currently in use by the registered user based on trolley data received via the communication module, and store the association in memory, and wherein trolley data transmitted by electronic trolley lock device indicates a location of the electronic trolley lock device, and the system controller is configured to determine when the location is outside an authorized use area, and determine when the location is within an authorized trolley holding area, the authorized trolley holding area being a designated area within the authorized use area.

2. The electronic trolley lock system according to claim 1, wherein the tracking module comprises:

a location tracking module, comprising at least one of:
a global positioning system module;
an indoor positioning system module; and
a cellular network-based positioning module;
and
a movement tracking module, comprising at least one of:
an accelerometer sensor module;
an infrared sensor module;
a vibration sensors module;
a magnetometer sensor module; and
a gyroscope sensor module.

3. The electronic trolley lock system according to claim 2, wherein each electronic trolley lock device is configured to function in a plurality of operating states, including:

an abandoned state, wherein the trolley is detected to be stationary outside the authorized trolley use area, and any one or more of:

a locked state, wherein the electronically activated lock associated with the electronic trolley lock device is locked, thereby inhibiting use of the trolley;

an unlocked state, wherein the electronically activated lock associated with the electronic trolley lock device is unlocked, thereby allowing use of the trolley;

a returned state, wherein the trolley is detected to be returned at an authorized trolley holding area;

a sleep state, wherein the electronic trolley lock device of the trolley is working with limited functionality of the device; and a switch off state, wherein the electronic trolley lock device of the trolley is in switch off state.

4. The electronic trolley lock system according to claim 1, wherein trolley data is transmitted to the system controller in response to unlocking of the electronically activated lock including unlock confirmation.

5. The electronic trolley lock system according to claim 3, wherein the authentication module further configured to disassociate a registered user already associated with an electronic trolley lock device of the trolley, and store the disassociation in memory, in response to detecting the trolley in a returned state.

6. The electronic trolley lock system according to claim 5, wherein the authentication module is further configured to, for each association of a registered user with the electronic trolley lock device, determine use permission for the trolley by the registered user based on authorization criteria and account status of the registered user.

7. The electronic trolley lock system according to claim 3, wherein the device controller of each of the electronic trolley lock device further configured to send abandonment alert notification to the system controller in response to detecting change in operating state to the abandoned state.

8. The electronic trolley lock system according to claim 1, wherein the trolley data comprises:

trolley information comprising at least one of: trolley usage information, trolley location information, trolley movement information, store information, operating state, unlock confirmation, trolley identification number, connectivity type, trolley battery status and type of trolley; and where the trolley is in use, user information comprising at least one of: user ID, user fingerprint information and user account information of the registered user.

9. The electronic trolley lock system according to claim 1, wherein the user device is at least one of:
a passive NFC tag;
a passive RFID tag;
a device with NFC capability;
a device with RFID capability;
an imaging device;
a device with Bluetooth Low Energy (BLE) capability; and
a device with LoRaWAN (Long Range Wide Area Network) based capability.

10. The electronic trolley lock system according to claim 1, wherein the user device is a portable scanning apparatus, comprising:

a portable scanning apparatus memory to store user information;

a scanning module to scan a visual code associated with at least one of the trolley or the electronic trolley lock device; and a portable scanning apparatus communication module to send trolley data to the communication control module of the system controller.

11. The electronic trolley lock system according to claim 1, wherein trolley data for transmission to the system controller is generated by the electronic trolley lock device, in response to detecting at least one of:
- a tap event using at least one, a passive NFC tag and a passive RFID tag on the electronic trolley lock device;
- a tap event using at least one a device with NFC capability and a device with RFID capability on the electronic trolley lock device;
- one or more user commands from a device with Bluetooth Low Energy (BLE) capability in vicinity to the electronic trolley lock device; and
- one or more user commands from a device with LoRaWAN (Long Range Wide Area Network) capability and in vicinity of the electronic trolley lock device.

12. The electronic trolley lock system according to claim 1, wherein the wireless communication module of the electronic trolley lock device comprises at least one of:
- one or more Near Field Communication (NFC) active tags;
- one or more Radio-Frequency Identification (RFID) active tags;
- one or more BLE modules;
- one or more LoRaWAN (Long Range) modules;
- one or more SIM card slots;
- one or more Wi-Fi modules;
- one or more infrared modules; and
- one or more IOT based communication modules.

13. The electronic trolley lock system according to claim 1, wherein each of one or more of the electronic trolley lock devices further comprise a battery unit to power one or more components of the electronic trolley lock device, wherein the battery unit is configured to charge one or more rechargeable batteries and wherein a charging cable to connect the battery unit with a charging source is fitted together with a locking cable, to facilitate both charging and locking functionality simultaneously when the trolley is in a returned state and connected to the charging source.

14. The electronic trolley lock system according to claim 1, wherein each of one or more of the electronic trolley lock devices further comprise a battery unit to power one or more components of the electronic trolley lock device, wherein the battery unit is configured to charge one or more rechargeable batteries associated with the battery unit and the system further comprises a self-charging module operably connected to the battery unit, the self-charging module including:
- at least one alternator, connected to a wheel of the trolley to generate power when the trolley is moved by the user.

15. A method for providing trolley service based on a request of a registered user intending to use a trolley enabled with an electronic trolley lock device, the method comprising:
- receiving by a system controller a trolley data signal including trolley data identifying the trolley and the registered user, derived from one or more actions performed by the registered user indicating a request to use the trolley;
- processing by the system controller, an authentication of the trolley data;
- if authorized,
- sending, by the system controller, unlocking request instructions to an electronic trolley lock device associated with the trolley;
- in response to the unlock instruction,
- unlocking by the electronic trolley lock device, an electronically activated lock associated with the trolley to provide an unlocking functionality by unfixing the trolley from a trolley holding area;
- transmitting unlock confirmation to the system controller;
- monitoring movement and location of the trolley; and
- determining when the location is outside an authorized use area, and
- determining when the location is within an authorized trolley holding area, the authorized trolley holding area being a designated area within the authorized use area.

16. The method according to claim 15, further comprising: associating the registered user with the electronic trolley lock device of the trolley currently in use by the registered user based on the trolley data and storing the association in memory and disassociating a registered user already associated with the electronic trolley lock device of the trolley, and storing the disassociation in memory, in response to detecting the trolley stationary in an authorized trolley holding area.

17. The method of claim 15, further comprising: detecting the trolley in any one of a plurality of operating states, wherein the operating states include an abandoned state, wherein the trolley is detected to be is detected to be stationary outside the authorized trolley use area and any one or more of:
- a locked state, wherein the electronically activated lock associated with the electronic trolley lock device is locked, thereby inhibiting use of the trolley;
- an unlocked state, wherein the electronically activated lock associated with the electronic trolley lock device is unlocked, thereby allowing use of the trolley;
- a returned state, wherein the trolley is detected to be returned at an authorized trolley holding area;
- a sleep state, wherein the electronic trolley lock device of the trolley is working with limited functionality of the device; and
- a switch off state, wherein the electronic trolley lock device of the trolley is in switch off state.

18. The method of claim 17, further comprising:
performing a transaction on the user account associated with the registered user based on the determined permitted use, wherein the transaction is performed by deducting a first token from the user account associated with the registered user.

19. The method of claim 18, further comprising:
performing a reverse transaction by adding a second token to the user account associated with the registered user in response to detecting operating state of the electronic trolley lock device from an unlocked state to a returned state.

* * * * *